US011780446B1

United States Patent
Srinivasan et al.

(10) Patent No.: US 11,780,446 B1
(45) Date of Patent: Oct. 10, 2023

(54) REFINING EVENT TRIGGERS USING MACHINE LEARNING MODEL FEEDBACK

(71) Applicant: Samsara Inc., San Francisco, CA (US)

(72) Inventors: Sharan Srinivasan, Sunnyvale, CA (US); Brian Tuan, Cupertino, CA (US); John Bicket, Burlingame, CA (US); Jing Wang, Toronto (CA); Muhammad Ali Akhtar, Chicago, IL (US); Abner Ayala Acevedo, Orlando, FL (US); Bruce Kellerman, Atlanta, GA (US); Vincent Shieh, San Francisco, CA (US)

(73) Assignee: Samsara Inc., San Francisco, CA (US)

( * ) Notice: Subject to any disclaimer, the term of this patent is extended or adjusted under 35 U.S.C. 154(b) by 0 days.

(21) Appl. No.: 17/661,689

(22) Filed: May 2, 2022

Related U.S. Application Data

(63) Continuation of application No. 17/454,773, filed on Nov. 12, 2021, now Pat. No. 11,352,013.

(60) Provisional application No. 63/117,271, filed on Nov. 23, 2020, provisional application No. 63/113,645, filed on Nov. 13, 2020.

(51) Int. Cl.
*B60W 40/09* (2012.01)
*G06V 20/59* (2022.01)
*G06T 7/73* (2017.01)
*G06N 3/045* (2023.01)

(52) U.S. Cl.
CPC ............. *B60W 40/09* (2013.01); *G06N 3/045* (2023.01); *G06T 7/73* (2017.01); *G06V 20/597* (2022.01)

(58) Field of Classification Search
CPC ....... B60W 40/09; G06N 3/0454; G06T 7/73; G06V 20/597
See application file for complete search history.

(56) References Cited

U.S. PATENT DOCUMENTS 5,917,433 A    6/1999  Keillor et al.
6,393,133 B1   5/2002  Breed et al.
(Continued)

FOREIGN PATENT DOCUMENTS

| CN | 108446600 A | 8/2018 |
| CN | 110766912 A | 2/2020 |
| KR | 102324978 B1 | 11/2021 |

OTHER PUBLICATIONS

U.S. Appl. No. 17/811,512, An Ensemble Neural Network State Machine for Detecting Distractions, filed Jul. 8, 2022.
(Continued)

*Primary Examiner* — Babar Sarwar
(74) *Attorney, Agent, or Firm* — Knobbe, Martens, Olson & Bear LLP

(57) ABSTRACT

A vehicle device may execute one or more neural networks (and/or other artificial intelligence), such as based on input from one or more of the cameras and/or other sensors associated with the dash cam, to intelligently detect safety events in real-time. The vehicle device may further pass the input to a backend server for further analysis and the backend server can detect safety events based on the input. The vehicle device may analyze the output of the vehicle device and the output of the backend server to determine whether the output of the vehicle device is correct. If the output of the vehicle device is incorrect, the vehicle device can adjust how the vehicle device identifies safety events.

20 Claims, 13 Drawing Sheets

(56) References Cited

U.S. PATENT DOCUMENTS

| | | |
|---|---|---|
| 6,452,487 B1 | 9/2002 | Krupinski |
| 8,633,672 B2 | 1/2014 | Jung et al. |
| 8,774,752 B1 | 7/2014 | Akcasu et al. |
| 9,024,744 B2 | 5/2015 | Klose et al. |
| 9,445,270 B1 | 9/2016 | Bicket et al. |
| 9,477,639 B2 | 10/2016 | Fischer et al. |
| 9,731,727 B2 * | 8/2017 | Heim ................ B60W 30/09 |
| 9,911,290 B1 | 3/2018 | Zalewski et al. |
| 9,952,046 B1 * | 4/2018 | Blacutt ................ G06V 20/597 |
| 10,033,706 B2 | 7/2018 | Bicket et al. |
| 10,085,149 B2 | 9/2018 | Bicket et al. |
| 10,102,495 B1 | 10/2018 | Zhang et al. |
| 10,173,486 B1 | 1/2019 | Lee et al. |
| 10,173,544 B2 | 1/2019 | Hendrix et al. |
| 10,196,071 B1 | 2/2019 | Rowson et al. |
| 10,206,107 B2 | 2/2019 | Bicket et al. |
| 10,255,528 B1 * | 4/2019 | Nguyen ................ B60W 30/12 |
| 10,390,227 B2 | 8/2019 | Bicket et al. |
| 10,489,222 B2 * | 11/2019 | Sathyanarayana ..... G07C 5/008 |
| 10,503,990 B2 * | 12/2019 | Gleeson-May ...... G06V 20/597 |
| 10,579,123 B2 | 3/2020 | Tuan et al. |
| 10,609,114 B1 | 3/2020 | Bicket et al. |
| 10,623,899 B2 | 4/2020 | Watkins et al. |
| 10,827,324 B1 | 11/2020 | Hajimiri et al. |
| 10,843,659 B1 | 11/2020 | Innocenzi et al. |
| 10,999,374 B2 | 5/2021 | ElHattab et al. |
| 11,046,205 B1 | 6/2021 | Govan et al. |
| 11,122,488 B1 | 9/2021 | Lloyd et al. |
| 11,126,910 B1 | 9/2021 | Akhtar et al. |
| 11,127,130 B1 | 9/2021 | Jain et al. |
| 11,128,130 B2 | 9/2021 | Jain et al. |
| 11,131,986 B1 | 9/2021 | Gal et al. |
| 11,132,853 B1 | 9/2021 | Akhtar et al. |
| 11,137,744 B1 | 10/2021 | Heddleston et al. |
| 11,158,177 B1 | 10/2021 | ElHattab et al. |
| 11,184,422 B1 | 11/2021 | Bicket et al. |
| 11,188,046 B1 | 11/2021 | ElHattab et al. |
| 11,190,373 B1 | 11/2021 | Stevenson et al. |
| 11,341,786 B1 | 5/2022 | Calmer et al. |
| 11,349,901 B1 | 5/2022 | Duffield et al. |
| 11,352,013 B1 | 6/2022 | Srinivasan et al. |
| 11,352,014 B1 | 6/2022 | Srinivasan et al. |
| 11,356,605 B1 | 6/2022 | Shemet et al. |
| 11,356,909 B1 | 6/2022 | Lloyd |
| 11,365,980 B1 | 6/2022 | Akhtar et al. |
| 11,386,325 B1 | 7/2022 | Srinivasan et al. |
| 11,451,610 B1 | 9/2022 | Saunders et al. |
| 11,451,611 B1 | 9/2022 | Saunders et al. |
| 11,479,142 B1 | 10/2022 | Govan et al. |
| 11,522,857 B1 | 12/2022 | Symons et al. |
| 11,558,449 B1 | 1/2023 | Bicket et al. |
| 11,599,097 B1 | 3/2023 | Gal et al. |
| 11,606,736 B1 | 3/2023 | Lloyd et al. |
| 2002/0061758 A1 | 5/2002 | Zarlengo et al. |
| 2002/0093565 A1 | 7/2002 | Watkins |
| 2005/0286774 A1 | 12/2005 | Porikli |
| 2006/0167591 A1 | 7/2006 | McNally |
| 2007/0080816 A1 * | 4/2007 | Haque ................ B60K 28/066 340/576 |
| 2008/0252412 A1 * | 10/2008 | Larsson ................ B60R 25/252 340/5.2 |
| 2008/0319602 A1 | 12/2008 | McClellan et al. |
| 2009/0034801 A1 | 2/2009 | Hammoud |
| 2009/0240427 A1 | 9/2009 | Siereveld et al. |
| 2010/0049639 A1 | 2/2010 | Ferro et al. |
| 2010/0203901 A1 | 8/2010 | Dinoff et al. |
| 2011/0276265 A1 | 11/2011 | Husain |
| 2012/0076437 A1 | 3/2012 | King |
| 2012/0201277 A1 | 8/2012 | Tanner et al. |
| 2012/0235625 A1 | 9/2012 | Takehara |
| 2012/0303397 A1 | 11/2012 | Prosser |
| 2013/0073114 A1 * | 3/2013 | Nemat-Nasser ...... B60W 40/09 382/104 |
| 2013/0162421 A1 | 6/2013 | Inaguma et al. |
| 2013/0212130 A1 | 8/2013 | Rahnama |
| 2013/0244210 A1 | 9/2013 | Nath et al. |
| 2014/0012492 A1 | 1/2014 | Bowers et al. |
| 2014/0095061 A1 | 4/2014 | Hyde |
| 2014/0098060 A1 | 4/2014 | McQuade et al. |
| 2014/0193781 A1 * | 7/2014 | Sands .................. G09B 19/167 434/64 |
| 2014/0195106 A1 | 7/2014 | McQuade et al. |
| 2014/0195477 A1 * | 7/2014 | Graumann ............ B60R 16/037 707/737 |
| 2014/0278108 A1 | 9/2014 | Kerrigan et al. |
| 2014/0324281 A1 * | 10/2014 | Nemat-Nasser ........ B60R 25/25 701/33.4 |
| 2014/0354227 A1 | 12/2014 | Tyagi et al. |
| 2014/0354228 A1 | 12/2014 | Williams et al. |
| 2014/0376876 A1 | 12/2014 | Bentley et al. |
| 2015/0024705 A1 | 1/2015 | Rashidi |
| 2015/0035665 A1 | 2/2015 | Plante et al. |
| 2015/0044641 A1 | 2/2015 | Chauncey et al. |
| 2015/0074091 A1 | 3/2015 | Walkin et al. |
| 2015/0084757 A1 | 3/2015 | Annibale et al. |
| 2015/0116114 A1 | 4/2015 | Boyles |
| 2015/0226563 A1 | 8/2015 | Cox et al. |
| 2015/0283912 A1 | 10/2015 | Shimizu et al. |
| 2016/0034770 A1 | 2/2016 | Peterson et al. |
| 2016/0046298 A1 * | 2/2016 | DeRuyck ............. G06V 20/597 340/576 |
| 2016/0267335 A1 * | 9/2016 | Hampiholi ............. B60K 28/06 |
| 2016/0275376 A1 | 9/2016 | Kant |
| 2016/0288744 A1 | 10/2016 | Rutherford et al. |
| 2016/0343091 A1 | 11/2016 | Han et al. |
| 2016/0375780 A1 | 12/2016 | Penilla et al. |
| 2017/0039784 A1 | 2/2017 | Gelbart et al. |
| 2017/0053555 A1 * | 2/2017 | Angel .................. G07C 5/0808 |
| 2017/0055868 A1 * | 3/2017 | Hatakeyama ........ A61B 3/0025 |
| 2017/0061222 A1 * | 3/2017 | Hoye .................. G07C 5/0891 |
| 2017/0088142 A1 * | 3/2017 | Hunt .................... B60W 40/09 |
| 2017/0102463 A1 | 4/2017 | Hwang |
| 2017/0113664 A1 * | 4/2017 | Nix ........................ G06V 20/56 |
| 2017/0140603 A1 | 5/2017 | Ricci |
| 2017/0200061 A1 * | 7/2017 | Julian .................... G06V 20/56 |
| 2017/0217444 A1 * | 8/2017 | Chaston ................. H04L 63/107 |
| 2017/0263049 A1 | 9/2017 | MacDonald et al. |
| 2017/0286838 A1 | 10/2017 | Cipriani et al. |
| 2017/0291611 A1 | 10/2017 | Innes et al. |
| 2017/0292848 A1 * | 10/2017 | Nepomuceno ..... G01C 21/3492 |
| 2017/0332199 A1 | 11/2017 | Elliott et al. |
| 2017/0345283 A1 | 11/2017 | Kwon et al. |
| 2017/0366935 A1 | 12/2017 | Ahmadzadeh et al. |
| 2018/0001771 A1 | 1/2018 | Park et al. |
| 2018/0012196 A1 | 1/2018 | Ricci et al. |
| 2018/0025636 A1 | 1/2018 | Boykin et al. |
| 2018/0039862 A1 * | 2/2018 | Hyatt ........................ G06T 7/73 |
| 2018/0048850 A1 | 2/2018 | Bostick et al. |
| 2018/0063576 A1 | 3/2018 | Tillman et al. |
| 2018/0093672 A1 | 4/2018 | Terwilliger et al. |
| 2018/0126901 A1 | 5/2018 | Levkova et al. |
| 2018/0189913 A1 | 7/2018 | Knopp et al. |
| 2018/0232583 A1 * | 8/2018 | Wang ..................... G06V 10/82 |
| 2018/0259353 A1 * | 9/2018 | Tsurumi ................ G01S 5/0072 |
| 2018/0262724 A1 | 9/2018 | Ross |
| 2018/0276485 A1 * | 9/2018 | Heck ........................ G06N 7/01 |
| 2018/0288182 A1 * | 10/2018 | Tong .................... G06V 20/597 |
| 2018/0365888 A1 * | 12/2018 | Satzoda ................ G05D 1/0251 |
| 2019/0003848 A1 | 1/2019 | Hoten et al. |
| 2019/0019068 A1 * | 1/2019 | Zhu ....................... G06V 10/764 |
| 2019/0023208 A1 * | 1/2019 | Boston ................ G06V 20/597 |
| 2019/0050657 A1 * | 2/2019 | Gleeson-May ........ G06V 10/50 |
| 2019/0118655 A1 | 4/2019 | Grimes et al. |
| 2019/0174158 A1 | 6/2019 | Herrick et al. |
| 2019/0244301 A1 | 8/2019 | Seth et al. |
| 2019/0286948 A1 | 9/2019 | Sathyanarayana et al. |
| 2019/0318419 A1 | 10/2019 | Vanderzanden |
| 2019/0327590 A1 | 10/2019 | Kubo et al. |
| 2019/0327613 A1 | 10/2019 | Bicket et al. |
| 2019/0370577 A1 * | 12/2019 | Meng .................... G06V 40/50 |
| 2020/0074397 A1 | 3/2020 | Burda et al. |
| 2020/0086879 A1 | 3/2020 | Lakshmi Narayanan et al. |
| 2020/0139847 A1 | 5/2020 | Baumer et al. |
| 2020/0150739 A1 | 5/2020 | Tuan et al. |

(56) References Cited

U.S. PATENT DOCUMENTS

| | | | |
|---|---|---|---|
| 2020/0162489 A1 | 5/2020 | Bar-Nahum et al. | |
| 2020/0192355 A1* | 6/2020 | Lu | G08G 1/09675 |
| 2020/0207358 A1 | 7/2020 | Katz et al. | |
| 2020/0238952 A1 | 7/2020 | Lindsay et al. | |
| 2020/0294220 A1 | 9/2020 | Gonzalez Diaz et al. | |
| 2020/0312063 A1* | 10/2020 | Balakrishnan | G08B 13/19697 |
| 2020/0327345 A1 | 10/2020 | Schumacher et al. | |
| 2020/0342230 A1 | 10/2020 | Tsai et al. | |
| 2020/0342235 A1 | 10/2020 | Tsai et al. | |
| 2020/0342274 A1 | 10/2020 | ElHattab et al. | |
| 2020/0342506 A1 | 10/2020 | Levy et al. | |
| 2020/0342611 A1 | 10/2020 | ElHattab et al. | |
| 2020/0344301 A1 | 10/2020 | ElHattab et al. | |
| 2020/0371773 A1 | 11/2020 | Kato et al. | |
| 2020/0389415 A1 | 12/2020 | Zhao et al. | |
| 2021/0006950 A1 | 1/2021 | Hajimiri et al. | |
| 2021/0073626 A1* | 3/2021 | Brahma | G05D 1/0088 |
| 2021/0104159 A1 | 4/2021 | Tsai et al. | |
| 2021/0201666 A1 | 7/2021 | Pelleg et al. | |
| 2021/0245749 A1 | 8/2021 | Ross et al. | |
| 2021/0279475 A1 | 9/2021 | Tusch et al. | |
| 2021/0287066 A1* | 9/2021 | Xie | G06N 3/044 |
| 2021/0337460 A1 | 10/2021 | Breaux, III et al. | |
| 2021/0394775 A1* | 12/2021 | Julian | G08G 1/164 |
| 2021/0403004 A1 | 12/2021 | Alvarez et al. | |
| 2022/0005332 A1 | 1/2022 | Metzler et al. | |

OTHER PUBLICATIONS

U.S. Appl. No. 17/454,799, An Ensemble Neural Network State Machine for Detecting Distractions, filed Nov. 12, 2021.

U.S. Appl. No. 17/726,386, Dynamic Delivery of Vehicle Event Data, filed Apr. 21, 2022.

U.S. Appl. No. 17/475,114, Dash Cam With Artificial Intelligence Safety Event Detection, filed Sep. 14, 2021.

U.S. Appl. No. 18/188,173, Dash Cam With Artificial Intelligence Safety Event Detection, filed Mar. 22, 2023.

U.S. Appl. No. 17/662,622, Tuning Layers of a Modular Neural Network, filed May 9, 2022.

U.S. Appl. No. 17/811,512, Ensemble Neural Network State Machine for Detecting Distractions, filed Jul. 8, 2022.

* cited by examiner

REFINING EVENT TRIGGERS USING MACHINE LEARNING MODEL FEEDBACK

CROSS-REFERENCE TO RELATED APPLICATIONS

This application is a continuation of U.S. patent application Ser. No. 17/454,773, filed Nov. 12, 2021, entitled "REFINING EVENT TRIGGERS USING MACHINE LEARNING MODEL FEEDBACK", which claims the benefit of U.S. Provisional Patent Application No. 63/113,645, filed Nov. 13, 2020, entitled "DYNAMIC DELIVERY OF VEHICLE EVENT DATA" and the benefit of U.S. Provisional Patent Application No. 63/117,271, filed Nov. 23, 2020, entitled "DASH CAM WITH ARTIFICIAL INTELLIGENCE SAFETY EVENT DETECTION," which are each hereby incorporated by reference herein in their entirety and for all purposes. Any and all applications for which a foreign or domestic priority claim is identified in the Application Data Sheet as filed with the present application are hereby incorporated by reference under 37 CFR 1.57 for all purposes and for all that they contain.

TECHNICAL FIELD

Embodiments of the present disclosure relate to devices, systems, and methods that provide real-time safety event detection within a vehicle.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Processing sensor data from a vehicle that is usable to detect, in real-time, events that are indicative of a crash or increased risk of a crash, requires significant data storage and processing power. The sensor data may be transmitted to a server for application of event models, but this requires wireless data communications (with bandwidth and data speed varying widely based on geography), which causes delays in determination of safety events, reducing effectiveness of any alerts that are provided to the driver in the vehicle. Thus, real-time alerts are typically limited to simple alerts with limited accuracy and limited value in improving driver safety.

SUMMARY

The systems, methods, and devices described herein each have several aspects, no single one of which is solely responsible for its desirable attributes. Without limiting the scope of this disclosure, several non-limiting features will now be described briefly.

Further, as described herein, according to various embodiments, systems and or devices may be configured and/or designed to compare the probability of an event from a local machine learning model and the probability of the event from a backend server to identify adjustments to how events are detected at the vehicle device. Further, the systems and/or devices can generate graphical user interface data useable for rendering various interactive graphical user interfaces. For example, the various interactive graphical user interfaces can identify how the detection of events is being adjusted. Additionally, the present disclosure describes various embodiments of a machine learning model feedback loop that is the result of significant development. This non-trivial development has resulted in the machine learning model feedback loop described herein which may provide significant increases and advantages over previous systems including increases in efficiency, cost-effectiveness, and accuracy. The machine learning model feedback loop may reduce the down time required to adjust the vehicle device by adjusting how events are detected by the vehicle device. This can increase the efficiency and accuracy of the on-device machine learning model. For example, the detection of events by the vehicle device can be modified in real-time after the machine learning model has been deployed to the vehicle device without requiring a separate model retraining. Various embodiments of the present disclosure provide improvements to various technologies and technological fields, and practical applications of various technological features and advancements. For example, as described above, existing machine vision systems are limited in various ways, and various embodiments of the present disclosure provide significant improvements over such technology, and practical applications of such improvements. Additionally, various embodiments of the present disclosure are inextricably tied to, and provide practical applications of, computer technology. While currently available devices may enable a system to retrain a machine learning model while the device is offline before redeploying the retrained machine learning model, such devices may require the device to be offline for the retraining of the machine learning model. Due to the retraining process and the offline status of the device, it is time consuming and costly to efficiently retrain the machine learning model to adjust how events are detected. Additionally, during the retraining process, the loss in efficiency can be significant so just redeploying the retrained machine learning model in a timely and efficient manner can be a significant issue.

Advantageously, various embodiments of the present disclosure may overcome various disadvantages of prior systems and methods. A vehicle device can be implemented in a vehicle. The vehicle device may include a computer readable storage medium having program instructions embodied therewith and one or more processors to execute the program instructions. The vehicle device may obtain sensor data associated with an image of a driver of the vehicle. The sensor data may include one or more objects associated with the driver of the vehicle. The one or more objects may include at least one of face of the driver or one or more hands of the driver. The vehicle device may route the sensor data to a receiving server system using a network connection with the receiving server system. The receiving server system may include a first neural network. The first neural network may output a first probability of an event based on a first probability of a feature of the one or more objects. The feature may include at least one of a hand action of the driver or a face pose of the driver. Further, the vehicle device may access a second neural network. The second neural network may output a second probability of the event based on a second probability of the feature of the one or more objects. Further, the vehicle device may identify a distracted state of the driver based at least in part on the second probability of the event. The vehicle device may obtain, from the receiving server system, a comparison of the first probability of the event and the second probability of the event. Further, the vehicle device may determine one or more updates to the vehicle device to increase accuracy of identifying the distracted state of the driver based on the comparison of the first probability of the event and the second probability of the event.

According to various embodiments, of the present disclosure, a vehicle device may include a computer readable storage medium having program instructions embodied therewith and one or more processors to execute the program instructions. The vehicle device may obtain sensor data associated with an image of a scene. The sensor data may include one or more objects in the image. Further, the vehicle device may route the sensor data to a receiving server system using a network connection with the receiving server system. The receiving server system may include a first neural network. The first neural network may output a first probability of an event based on a first probability of a feature of the one or more objects. Further, the vehicle device may access a second neural network. The second neural network may output a second probability of the event based on a second probability of the feature of the one or more objects. Further, the vehicle device may identify the event based at least in part on the second probability of the event. The vehicle device may obtain, from the receiving server system, a comparison of the first probability of the event and the second probability of the event. Further, the vehicle device may determine one or more operations to dynamically adjust how the vehicle device identifies the event based on the comparison of the first probability of the event and the second probability of the event.

In various embodiments, the image of the scene may correspond to an image of a vehicle driver associated with a vehicle. Further, the vehicle device may be implemented in the vehicle. The one or more objects may include at least one of a face of the vehicle driver or one or more hands of the vehicle driver. The feature of the one or more objects may include at least one of a hand action of the vehicle driver or a face pose of the vehicle driver.

In various embodiments, the event may include a distracted state of a vehicle driver.

In various embodiments, the vehicle device may determine the event includes a false positive event in response to determining that the first probability of the event exceeds the second probability of the event by at least a particular amount.

In various embodiments, the vehicle device may identify the event based on a prediction schedule. Further, the vehicle device may, in response to determining that the event includes a false positive event, adjust the prediction schedule.

In various embodiments, the vehicle device may identify the event based on a determination that the second probability of the event is greater than a prediction threshold.

In various embodiments, the vehicle device may determine the event includes a false positive event based at least one comparison of the first probability of the event and the second probability of the event.

In various embodiments, the vehicle device may adjust the prediction threshold in response to determining the event includes the false positive event.

In various embodiments, the vehicle device may identify the event by determining that the second probability of the event is less than a prediction threshold indicative of non-occurrence of the feature. The vehicle device may further identify the event by determining that the event includes a false negative event based on the comparison of the first probability of the event and the second probability of the event. Further, the vehicle device may identify the event by adjusting the prediction threshold based on identifying the false negative event.

In various embodiments, the vehicle device may identify the event by identifying, using a third neural network, the event based on the second probability of the event.

In various embodiments, the vehicle device may identify the event by identifying, using a third neural network, the event based on the second probability of the event. The vehicle device may determine the event includes a false positive event based on comparing the first probability of the event and the second probability of the event. Further, the vehicle device may train the third neural network. The first probability of the event may be provided as an expected output of the third neural network. The one or more characteristics of the image may be provided as an input to train the third neural network.

In various embodiments, the vehicle device may identify the event by identifying, using a third neural network, the event based on the second probability of the event. The vehicle device may determine the event includes a false positive event based on comparing the first probability of the event and the second probability of the event. Further, the vehicle device may train the third neural network. The first probability of the event may be provided as an expected output of the third neural network. The one or more characteristics of the image may be provided as an input to train the third neural network. The one or more characteristics of the image may include time of day data, a time associated with generation of the event, or a confidence score of the event.

In various embodiments, the vehicle device may identify the event by generating, using a third neural network, the event based on the second probability of the event. The vehicle device may determine the event includes a false positive event based on comparing the first probability of the event and the second probability of the event. Further, the vehicle device may train the third neural network. The first probability of the event may be provided as an expected output of the third neural network. The second probability of the event may be provided as an input to train the third neural network.

In various embodiments, the second probability may be associated with a first frame. The vehicle device may identify the event based on the second probability and a third probability of the event. The third probability may be associated with a second frame.

In various embodiments, the vehicle device may obtain input from a user computing device. Further, the vehicle device may determine the event includes a false positive event based on the input.

In various embodiments, the vehicle device may provide an indication of the event to a user computing device. Further, the vehicle device may obtain input from the user computing device. The vehicle device may determine the event comprises a false positive event based on the input.

In various embodiments, the vehicle device may implement the one or more operations without retraining the second neural network. Further, the vehicle device may obtain additional sensor data associated with an additional image of an additional scene. The additional sensor data may identify one or more additional objects of the additional image. Further, the vehicle device may access the second neural network. The second neural network may output a third probability of an additional event. Further, the vehicle device may identify an additional event based on the third probability of the additional event and the one or more operations.

In various embodiments, the vehicle device may implement the one or more operations without retraining the second neural network. Further, the vehicle device may identify a non-event based on the second probability of the event and the one or more operations.

According to various embodiments of the present disclosure, a method can include obtaining sensor data associated with an image of a scene. The sensor data may include one or more objects in the image. The method may further include routing the sensor data to a receiving server system using a network connection with the receiving server system. The receiving server system may include a first neural network. The first neural network may output a first probability of an event based on a first probability of a feature of the one or more objects in the image. The method may further include accessing a second neural network. The second neural network may output a second probability of the event based on a second probability of the feature of the one or more objects in the image. The method may further include identifying the event based at least in part on the second probability of the event. The method may further include obtaining, from the receiving server system, a comparison of the first probability of the event and the second probability of the event. The method may further include determining one or more operations to dynamically adjust how events are identified based on the comparison of the first probability of the event and the second probability of the event. The method may further include implementing the one or more operations without retraining the second neural network. The method may further include obtaining additional sensor data associated with an additional image of an additional scene. The additional sensor data may identify one or more additional objects of the additional image. The method may further include accessing the second neural network. The second neural network may output a third probability of an additional event. The method may further include identifying the additional event based on the third probability of the additional event and the one or more operations.

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

DETAILED DESCRIPTION

Figure 1A:
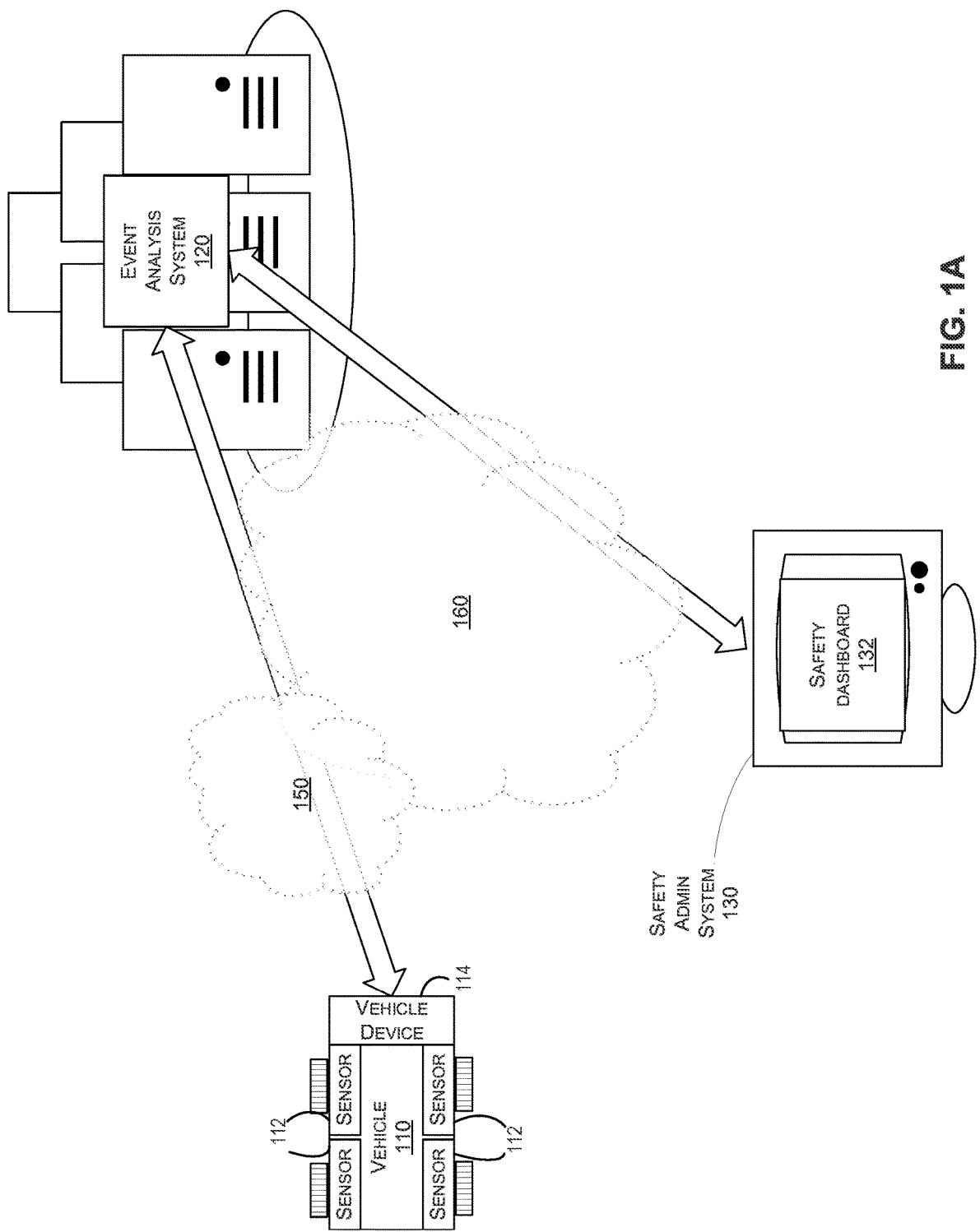
FIG. 1A illustrates an event analysis system in communication with a vehicle device and a safety admin system.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Overview

An improved artificial intelligence dash cam provides real-time alerts of detected safety events, such as driver assistance (e.g., ADAS or "Advanced Driver Assistance Systems"), harsh events, and/or other events of interest. The dash cam is installable into existing vehicles and provides real-time alerts based on processing of video data from one or more cameras of the dash cam. The safety event detection is performed local to the dash cam without transmitting data to a backend server for processing, so that the alerts are immediately actionable by the vehicle driver in reducing frequency and severity of accidents.

In some embodiments, the dash cam (which is referred to more generally as a "vehicle device") is configured to execute one or more neural networks (and/or other artificial intelligence or program logic), such as based on input from one or more of the cameras and/or other sensors associated with the dash cam, to intelligently detect safety events. The dash cam includes logic for determining which asset data to transmit to a backend server in response to detection of a safety event, as well as which asset data to transmit to the backend server in response to analysis of sensor data that did not trigger a safety event. The asset data transmitted to the backend server may be further analyzed to determine if further alerts should be provided to the driver and/or to a safety manager.

In some embodiments, the backend server (also referred to herein as the "backend," the "cloud," or an "event analysis system") may have context and perspective that individual vehicle devices do not have. For example, the backend may include data associate with a large quantity of vehicles, such as vehicles across a fleet or within a geographic area. Thus, the backend may perform analysis of asset data across multiple vehicles, as well between groups of vehicles (e.g., comparison of fleets operated by different entities). The backend can use uploaded asset data to optimize for both customer experience and data transfer quantity. For example, using metadata from a safety event (whether a false or positive safety event), the backend can make an informed go/no-go decision on whether a particular event should be shown in a safety dashboard or whether it may be a false positive. The backend may then decide whether asset data associated with the safety event should be transmitted from the vehicle device to the backend, for example only if the detected event is a positive event or an event meeting certain criteria. Thus, the amount of data transmitted to the backend server may be largely reduced, while maintaining the ability for the backend server to obtain as much data as needed to improve the event models (e.g., the neural networks that are executed on the vehicle device), further analyze asset data for applicability of safety events, and transmit corresponding alerts. An event analysis system may also include a feedback system that periodically updates event models used by vehicle devices to provide immediate in-vehicle alerts, such as when the backend server has optimized an event model based on analysis of asset data associated with many safety events, potentially across multiple fleets of vehicles.

In various embodiments, the vehicle device and the backend server may each detect whether the input from the one or more cameras and/or the other sensors includes a particular feature (e.g., whether an object (e.g., a face of the user, a hand of the user, etc.) of the input is associated with a particular feature). For example, the vehicle device and the backend server can each indicate a probability that the face of a user of the vehicle is oriented in a particular direction and/or that a hand of the user is performing a particular hand action (e.g., holding a phone). Based on the probability of the feature, the vehicle device and the backend server can identify probabilities of events (e.g., whether the user of the vehicle is distracted). If the vehicle device and/or the backend server determines that the input includes a particular feature (e.g., the user of the vehicle is holding a phone), the vehicle device and/or the backend server may determine the occurrence of an event (e.g., the user of the vehicle is distracted) within the input. The backend server can provide output identifying a probability of a particular feature and/or a probability of the event to the vehicle device for comparison with the output identifying a probability of the particular feature and/or identifying a probability of the event of the vehicle device. In some embodiments, the vehicle device can provide output to the backend server for comparison with the output of the backend server.

Based on receiving the output from the backend server, the vehicle device can compare the output from the backend server to the output of the vehicle device. The vehicle device can compare the outputs to determine if the output of the vehicle device corresponds to a false positive (e.g., the vehicle device determines an event and the backend server does not determine an event), a true positive (e.g., the vehicle device and the backend server determine events), a false negative (e.g., the vehicle device does not determine an event and the backend server does determine an event), or a true negative (e.g., the vehicle device and the backend servers do not determine an event). For example, the vehicle device may consider the output of the backend server to be accurate (e.g., more accurate than the output of the vehicle device). The vehicle device may consider the output of the backend server to be accurate based on the resource differences between the vehicle device and the backend server (e.g., the backend server may have a significant resource advantage over the vehicle device). Further, the vehicle device may determine whether the output of the vehicle device corresponds to a false positive based on the output of the backend server (e.g., if the output of the vehicle device indicates an event and the output of the backend server does not indicate an event, the vehicle device may determine the output of the vehicle device is a false positive). Further, based on the comparison, the vehicle device can perform one or more additional operations to adjust how the vehicle device detects and/or identifies events.

The vehicle device can implement a backoff algorithm based the comparison of the output of the backend server and the output of the vehicle device. For example, the vehicle device can implement the backoff algorithm based on determining that the output of the backend server and the output of the vehicle device do not correspond. Further, the backoff algorithm may be a naïve exponential backoff algorithm. In order to implement the backoff algorithm, the vehicle device may implement a wait period (e.g., a prediction schedule) before subsequently attempting to identify features of the input from the cameras and/or other sensors. For example, if the vehicle device detects multiple false positives, the vehicle device may implement progressively longer wait periods before attempting to detect features in the input of the cameras and/or the sensors. Further, the vehicle device may implement progressively longer wait periods before attempting to identify events.

The vehicle device can further tune a prediction number (e.g., a prediction threshold) for identifying particular features based on the comparison of the output of the backend server and the output of the vehicle device. For example, the vehicle device may detect a feature by determining if the output of the machine learning model (e.g., a probability of an occurrence of the feature) exceeds a particular prediction number. Based on the comparison of the outputs, the vehicle device can dynamically tune the prediction number. For example, the vehicle device can dynamically raise and/or lower the prediction number. Further, the vehicle device can dynamically raise the prediction number if the comparison of the outputs indicates that the output of the vehicle device is a false positive. The vehicle device can dynamically lower the prediction number if the comparison of the outputs indicates that the output of the vehicle device is a true positive. Further, the vehicle device can further tune a prediction number for identifying events based on the comparison of the output of the backend server and the output of the vehicle device. For example, the vehicle device may detect an event if the output of the vehicle device exceeds a particular prediction number The vehicle device can further train a machine learning model to identify false positives based on the comparison of the output of the backend server sand the output of the vehicle device. The vehicle device can train the machine learning model by providing high-order characteristics (e.g., the time of day, the duration of detection, the confidence score output, or any other characteristics associated with the input from the cameras and/or sensors) as inputs to the machine learning model and the output of the backend server as an expected output of the machine learning model. Based on the inputs and the expected output, the machine learning model can be trained to identify clusters of likely false positives (e.g., false positive features, false positive events, etc.). If a particular feature and/or event is similar to the clusters of likely false positives, the machine learning model may determine that the feature and/or the event is likely a false positive and dismiss the feature and/or the event.

Terms

To facilitate an understanding of the systems and methods discussed herein, several terms are described below. These terms, as well as other terms used herein, should be construed to include the provided descriptions, the ordinary and customary meanings of the terms, and/or any other implied meaning for the respective terms, wherein such construction is consistent with context of the term. Thus, the descriptions below do not limit the meaning of these terms, but only provide example descriptions.

Vehicle Device: an electronic device that includes one or more sensors positioned on or in a vehicle. A vehicle device may include sensors such as one or more video sensors, audio sensors, accelerometers, global positioning systems (GPS), and the like. Vehicle devices include communication circuitry configured to transmit event data to a backend (or "event analysis system"). Vehicle devices also include memory for storing software code that is usable to execute one or more event detection models, such as neural network or other artificial intelligence programming logic, that allow the vehicle device to trigger events without communication with the backend.

Event of interest (or "event"): circumstances of interest to a safety manager, fleet administrator, vehicle driver, and/or others. Events may be identified based on various combinations of characteristics associated with one or more vehicles. For example, an event associated with a vehicle may indicate a safety concern, such as a likelihood of a crash by the vehicle is above an expected threshold level.

Safety Event: an event that indicates an accident involving a vehicle, such as a crash of the vehicle into another vehicle or structure, or an event that indicates an increased likelihood of a crash of vehicle.

Driver Assistance Event: one type of safety event that does not necessarily indicate a crash, or imminent crash, but indicates that the driver should take some action to reduce likelihood of a crash. For example, driver assistance events may include safety events indicating that a vehicle is tailgating another vehicle, the vehicle is at risk of a forward collision, or the driver of the vehicle is distracted.

Harsh Event: one type of safety event indicating an extreme action of a driver and/or status of a vehicle. Harsh events may include, for example, detecting that a driver has accelerated quickly, has braked extensively, has made a sharp turn, or that the vehicle has crashed.

Event Model (or "triggering criteria"): a set of logic that may be applied to asset data to determine when an event has occurred. An event model may be, for example, an algorithm, statistical model, or neural network that takes as input one or more types of asset data. An event model may be stored in any format, such as a list of criteria, rules, thresholds, and the like, that indicate occurrence of an event. Event models may be executed by a vehicle device and/or by an event analysis system (e.g., in the cloud).

Sensor Data: any data obtained by the vehicle device, such as asset data and metadata.

Event Data: data associated with an event, such as a set of sensor data (e.g., metadata and/or asset data), such as photographs, video files, etc., associated with a detected safety event.

Asset Data (or "Asset"): any data associated with a vehicle and/or driver of the vehicle, such as data that is usable by an event model to indicate whether a safety event has occurred. Asset data may include video files, still images, audio data, and/or other data files.

Example of asset data include:

- Video files, which may be uploaded for each camera of a multi-camera vehicle device. Video files that are uploaded to the event analysis system may be trimmed to a default length by the vehicle device (e.g., 3 seconds before and 3 seconds after the detected safety event) and/or may be selected based on rules associated with the detected event. Video transcode may be customized to adjust the bit rate, frame rate, resolution, etc. of video files.
- Still Images from each camera, e.g., single frames of a video file, may be transmitted to the event analysis system either as part of initial event data transmitted to the event analysis system after detecting a safety event and/or in response to a request for still images from the event analysis system. In situations where the event analysis system requests still images from a vehicle device, the event analysis system may determine image settings (e.g., image quality, downsampling rate, file size, etc.), as well as timeframe from which images are requested (e.g., one image every 0.2 seconds for the five second time period preceding the detected event).
- Audio data can be combined with video, or sent separately and transcoded into video files after the fact. The event analysis system may determine audio transcoding parameters for requested audio data.

Metadata: data that provides information regarding a detected event, typically in a more condensed manner than the related asset data. Metadata may include, for example, accelerometer data, global positioning system (GPS) data, ECU data, vehicle speed data, forward camera object tracking data, inward (driver)-facing camera data, hand tracking data and/or any other related data. For example, metadata regarding a triggered event may include a location of an object that triggered the event, such as a vehicle in which a forward collision warning ("FCW") or tailgating safety event has triggered, or position of a driver's head ("head pose") when a distracted driver event has triggered. Metadata may include calculated data associated with a detected safety event, such as severity of the event, which may be based on one or more event models that may consider duration of an event, distance to a leading vehicle, and/or other event data. Metadata may include information about other vehicles within the scene in the case of tailgating or FCW event, as well as confidence levels for these detections. Metadata may also include information such as event keys and other identification information, event type, event date and time stamps, event location, and the like.

Features: an "interesting" part of sensor data, such as data that is extracted from and/or derived from sensor data and may provide an abstraction of the sensor data. Event models may identify features, such as those that are useful in triggering a safety event. Features may include items (and/or metadata associated with those Items) such as objects within images obtained by one of the cameras of the dash cam. Other examples of features may include eye pose, head pose (e.g., a head pose in a particular direction, a head pose in a direction towards a phone, etc.), hand actions (e.g., a hand action of holding a phone, a hand action of texting, a hand action of holding food, etc.), objects in images, other vehicle metadata, such as GPS, acceleration, and the like.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, PostgreSQL databases, etc.), non-relational databases (e.g., NoSQL databases, etc.), in-memory databases, spreadsheets, comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores. Additionally, although the present disclosure may show or describe data as being stored in combined or separate databases, in various embodiments such data may be combined and/or separated in any appropriate way into one or more databases, one or more tables of one or more databases, etc. As used herein, a data source may refer to a table in a relational database, for example.

Example Event Detection Models

As will be discussed further herein, the vehicle device and/or the event analysis system may implement certain machine learning techniques that are configured to identify features within sensor data, such as in images from one or more of the outward-facing or inward-facing cameras of the vehicle device, audio detected by one or more microphones of the vehicle device, metadata from other sensors, and the like. The feature detection may be performed by a feature detection module (e.g., part of the vehicle device and/or the event detection system), which may include program code executable by one or more processors to analyze video data, audio data, sensor data (e.g., motion sensors, positioning, etc.) and/or any other sensor data. While some of the discussion herein is with reference to analysis of video data, such discussions should be interpreted to also cover analysis of any other type of data, such as any asset data.

In some embodiments, the vehicle device can process video data locally to identify various associated features, such as detection of an object (e.g., a person or a vehicle), characteristics of the object (e.g., speed, distance, dimensions, etc.), location of the object within the image files of the video, and the like. This feature data comprises metadata, which can be indexed (e.g., to a corresponding video recording or video feed) to track the time ranges that each detection begins and ends in video data. Such metadata, and other optimized data, can then be analyzed by event detection models executing on the vehicle device and/or selectively transmitted to the event analysis system.

In some embodiments, the feature detection module and/or event models (e.g., executed by the vehicle device or the event analysis system) can include a machine learning component that can be used to assist in detection of safety events, such as in real-time at the vehicle device. For example, the machine learning component can implement machine learning algorithms or artificial intelligence (AI) to generate and/or update neural networks that are executed by a processor (e.g., in the vehicle device and/or the event analysis system). In some embodiments, the machine learning component can use one or more machine learning algorithms to generate one or more models or parameter functions for the detections. The machine learning component can be configured to generate an event model that understands which types of data indicate which types of detections. One or more of these event models may be used to determine an expected value or occurrence based on analysis of received data. In some embodiments, video recording criteria (e.g., pre-configured video recording criteria) can be designated by a user, admin, or automatically. For example, the video recording criteria can indicate which types of detected features to monitor, record, or analyze. By designating specific types of detections, resources (e.g., processing power, bandwidth, etc.) can be preserved for only the types of feature detections desired.

Various types of algorithms may be used by the machine learning component to generate the event detection models (e.g., that perform feature detection and related event detection). For example, certain embodiments herein may use a logistical regression model, decision trees, random forests, convolutional neural networks, deep networks, or others. However, other event detection models are possible, such as a linear regression model, a discrete choice model, or a generalized linear model. The machine learning algorithms can be configured to adaptively develop and update the event detection models over time based on new input received by the machine learning component. For example, the event detection models executed by the vehicle device may be regenerated on a periodic basis (e.g., by the event analysis system) as new received data is available to help keep the predictions in the event detection model more accurate as the data is collected over time. Also, for example, the event detection models may be regenerated based on configurations received from a user or management device.

Some non-limiting examples of machine learning algorithms that can be used to generate and update event detection models can include supervised and non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, Apriori algorithms), artificial neural network algorithms (such as, for example, Perceptron), deep learning algorithms (such as, for example, Deep Boltzmann Machine), dimensionality reduction algorithms (such as, for example, Principal Component Analysis), ensemble algorithms (such as, for example, Stacked Generalization), and/or other machine learning algorithms.

These machine learning algorithms may include any type of machine learning algorithm including hierarchical clustering algorithms and cluster analysis algorithms, such as a k-means algorithm. In some cases, the performing of the machine learning algorithms may include the use of an artificial neural network. By using machine-learning techniques, copious amounts (such as terabytes or petabytes) of received data may be analyzed to generate models without manual analysis or review by one or more people.

Example Event Analysis System and Vehicle Device

FIG. 1A illustrates an event analysis system 120 in communication with a vehicle device 114 and a safety admin system 130. In this embodiment, the vehicle 110 includes a vehicle device 114, which may physically incorporate and/or be coupled to (e.g., via wired or wireless communication channel) a plurality of sensors 112. In some embodiments, the vehicle device 114 comprises a dash cam, such as the example dash cam illustrated in FIGS. 1B-1D. In other embodiments, the vehicle device 114 may include other components.

The sensors 112 may include, for example, one or more inward-facing camera and one or more outward-facing camera. The vehicle device 114 further includes one or more microprocessors and communication circuitry configured to transmit data to the event analysis system 120, such as via one or more of the networks 150, 160. In this example, a safety dashboard 132 may be generated on a safety admin system 130 to illustrate event data from the event analysis system 120, such as via an online portal, e.g., a website or standalone application. The safety admin system 130 may be operated, for example, by a safety manager that reviews information regarding triggered safety events associated with a fleet of drivers/vehicles.

Various example computing devices 114, 120, and 130 are shown in FIG. 1A. In general, the computing devices can be any computing device such as a desktop, laptop or tablet computer, personal computer, tablet computer, wearable computer, server, personal digital assistant (PDA), hybrid PDA/mobile phone, mobile phone, smartphone, set top box, voice command device, digital media player, and the like. A computing device may execute an application (e.g., a browser, a stand-alone application, etc.) that allows a user to access interactive user interfaces, view images, analyses, or aggregated data, and/or the like as described herein. In various embodiments, users may interact with various components of the example operating environment (e.g., the safety admin system 130, the event analysis system 120, etc.) via various computing devices. Such interactions may typically be accomplished via interactive graphical user interfaces or voice commands, however alternatively such interactions may be accomplished via command line, and/or other means.

As shown in the example of FIG. 1A, communications between the vehicle device 114 and event analysis system 120 primarily occurs via network 150, while communication between the event analysis system 120 and safety admin system 130 typically occurs via network 160. However, networks 150, 160 may include some or all of the same communication protocols, services, hardware, etc. Thus, although the discussion herein may describe communication between the vehicle device 114 and the event analysis system 120 via the network 150 (e.g., via cellular data) and communication between the event analysis system 120 and the safety admin system 130 via a wired and/or a wireless high-speed data communication network, communications of the devices are not limited in this manner.

In some embodiments, the vehicle device transmits encrypted data via SSL (e.g., 256-bit, military-grade encryption) to the event analysis system 120 via high-speed 4G LTE or other wireless communication technology, such as 5G communications. The network 150 may include one or more wireless networks, such as a Global System for Mobile Communications (GSM) network, a Code Division Multiple Access (CDMA) network, a Long Term Evolution (LTE) network, or any other type of wireless network. The network 150 can use protocols and components for communicating via the Internet or any of the other aforementioned types of networks. For example, the protocols used by the network 150 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The network 160 may similarly include any wired network, wireless network, or combination thereof. For example, the network 160 may comprise one or more local area networks, wide area network, wireless local area network, wireless wide area network, the Internet, or any combination thereof.

Figure 1B:
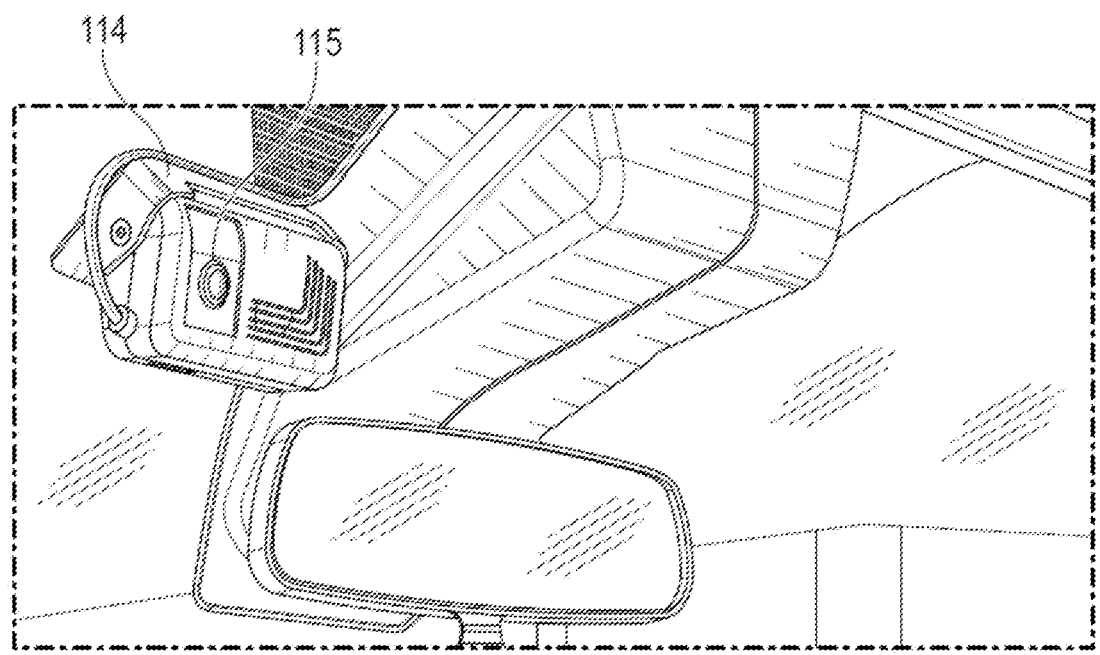
FIG. 1B illustrates an example vehicle device mounted inside a vehicle.
Figure 1C:
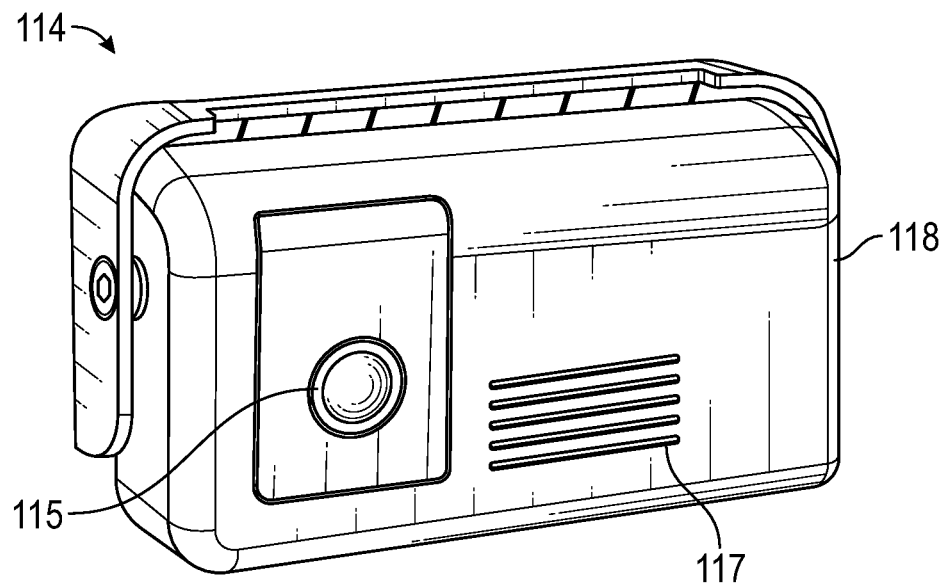
FIG. 1C is a front view of the vehicle device of FIG. 1B, showing the inward-facing camera.
Figure 1D:
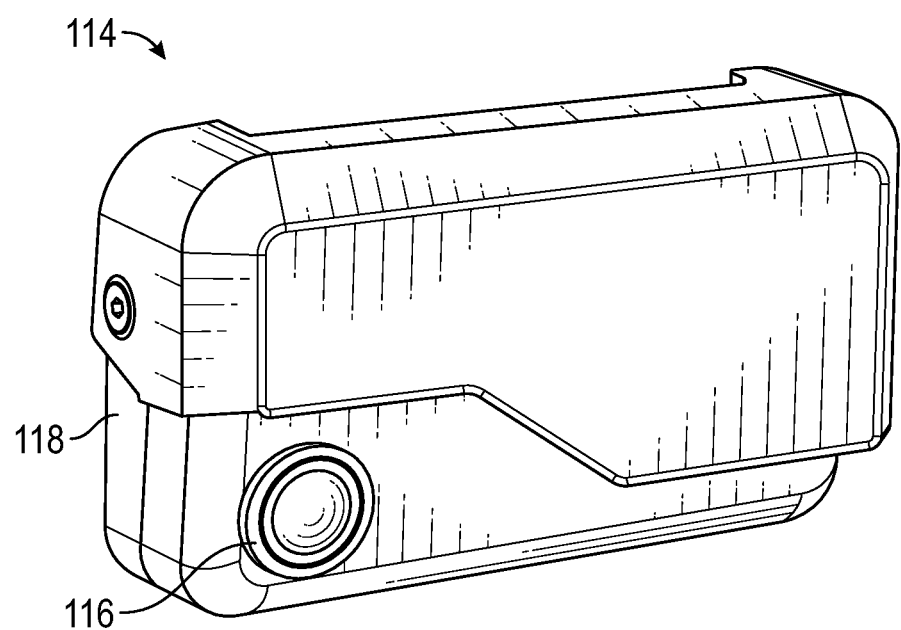
FIG. 1D is a rear view of the vehicle device of FIG. 1B, showing an outward-facing camera.

FIG. 1B illustrates an example vehicle device 114 with an inward-facing camera 115 mounted inside a vehicle. FIG. 1C is a front view of the vehicle device 114 showing the inward-facing camera 115, and FIG. 1D is a rear view of the vehicle device 114 showing an outward-facing camera 116 (e.g., positioned to obtain images forward of the vehicle). In this example, the vehicle device 114 includes an access panel 117 configured to allow alert signals from a speaker within the enclosure 118 of the vehicle device 114 to be better heard within the vehicle. In some embodiments, a microphone is positioned behind the access panel 117 also, or behind a similar additional access panel. In other embodiments, the vehicle device may include different quantities of video and/or still image cameras. These dual-facing cameras (e.g., the inward-facing camera 115 and one or more outward-facing cameras 116) may be configured to automatically upload and/or analyze footage using event detection models configured to detect (or "trigger") safety events. For example, as discussed further herein, the vehicle device 114 may advantageously apply event detection models to sensor data, including video data from one or more of the cameras, to detect safety events in real time as the events are happening. While the specifications of vehicle devices may vary greatly from one implementation to another, in one example embodiment a vehicle device may include some or all of the components below:

Outward-facing camera with a field of view of 121° or more, resolution of at least 1080p (Full HD) video, frame rate of at least 30 frames per second, HDR to optimize for bright and low-light conditions.
  Inward-facing camera with a field of view of 177° or more to identify unsafe in-cab behaviors, resolution of at least 720p (HD) video, frame rate of at least 30 frames per second, infrared LED for unlit nighttime in-cab video.
  Audio input and/or output device(s) configured to provide voice coaching, such as voice-based feedback and alerts in response to detection of safety events, as well as the ability to turn on audio capture (e.g., via one or more microphones) for extra context during disputes and incidents.

Recording capabilities and storage to record video footage for a rolling time period. For example, 60-100 hours or more of driving time video may be stored on the vehicle device, with an option for retrieval by the event analysis system, such as to provide additional context associated with a detected safety event in a safety dashboard. Video data may be automatically uploaded to an event analysis system (e.g., in the cloud) for further analysis, such as automatically uploading five seconds before to five seconds after each safety event is detected. Still images may also be captured and stored locally and/or transmitted to the event analysis system. A panic button may be provided to allow the driver to manually trigger a safety event and upload video footage from one or more of the cameras. For example, the panic button may be a physical button on the vehicle device enclosure 118 and/or a virtual (or software) button that may be activated by a voice command from the driver (or a passenger in the vehicle).

Data transfer circuitry configured to automatically upload event data (e.g., metadata and asset data) to the event analysis system, where the event data may be further analyzed. In some implementations, the data transfer circuitry is configured to detect availability of cellular connectivity and, when connectivity is below a threshold, delay transmission of until cellular connectivity improves.

Mounting hardware for easily mounting on the inside of a windshield, such as with heavy duty acrylic foam tape, suction cup, velcro, or the like. Tilt control to allow for proper inward-facing orientation with a wide variety of windshields.

One or more accelerometers, such as accelerometers that measure acceleration (and/or related G forces) in each of multiple axes, such as in an X, Y, and Z axis.

One or more computer processors, such as high-capacity processors that enable concurrent neural networks for real-time artificial intelligence.

Example Safety Event Detection and Communications

Figure 2:
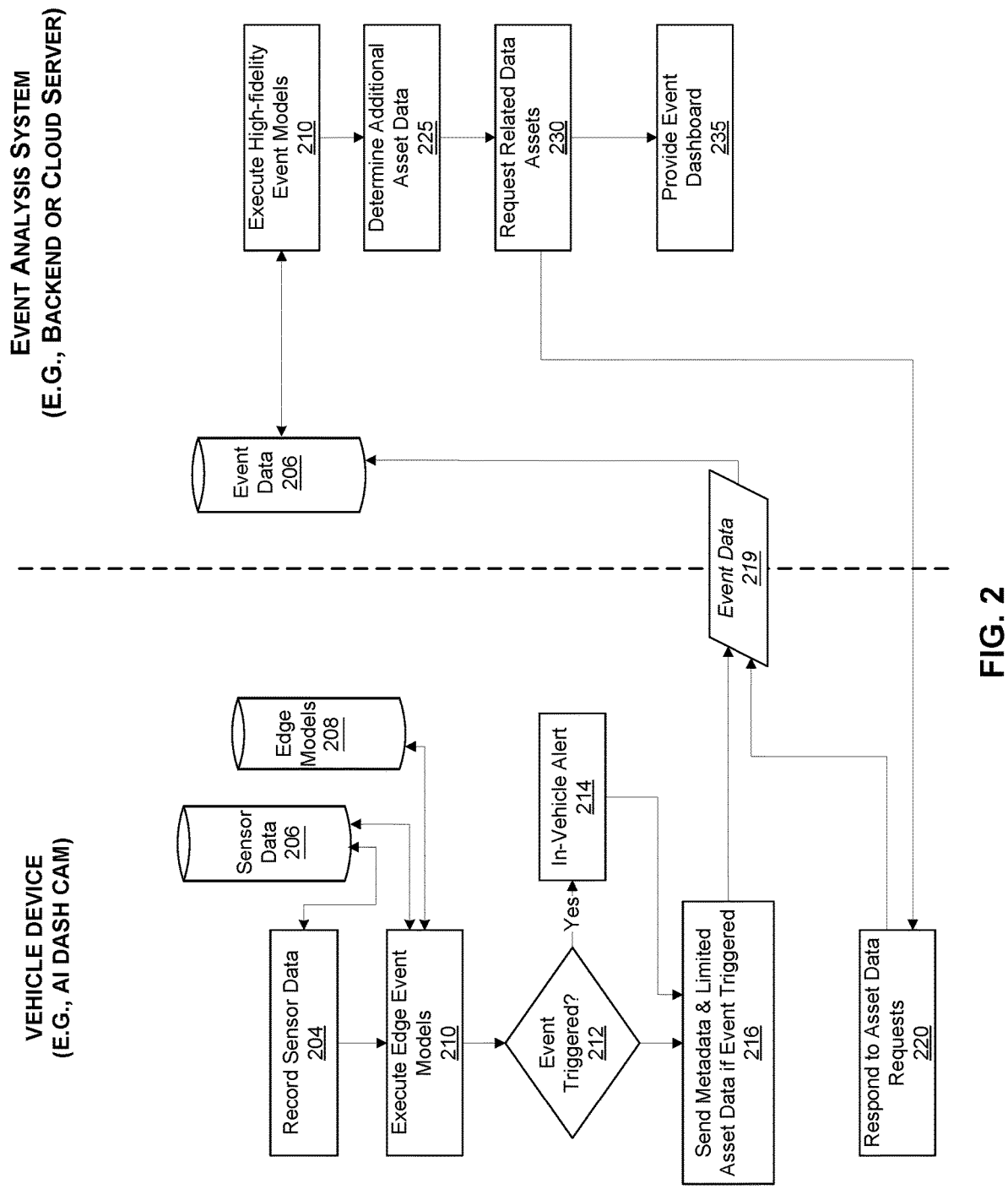
FIG. 2 is a flow diagram illustrating an example process for the vehicle device to detect safety events.

FIG. 2 is a flow diagram illustrating an example process for the vehicle device to detect safety events, such as by processing video data using one or more neural networks, and selectively communicating event data to an event analysis system. In general, the processes illustrated on the left are performed by the vehicle device, while processes on the right are performed by an event analysis system. Depending on the embodiment, however, the processes may be performed by different devices than illustrated, the method may include fewer or additional blocks, and/or the blocks may be performed in an order different than is illustrated.

Beginning at block 204, sensor data (e.g., video data) is stored for processing by one or more event models. For example, sensor data output from the multiple sensors 112 associated with the vehicle device 114 of FIG. 1A may be recorded at block 204. As shown, at least some of the sensor data (e.g., metadata and asset data) is stored in a sensor data store 206. For example, video data and metadata from one or more sensors may be stored for a particular time period (e.g., 2, 12, 24 hours, etc.).

Next, at block 210, one or more event models are executed on the sensor data, which may be accessible via the sensor data store 206. In some embodiments, the event models executed at block 210 are configured to identify harsh events indicative of a sudden, extreme, and/or unexpected movement of the vehicle and/or driver. Related U.S. Application No. 63/113,645, titled "Dynamic Delivery of Vehicle Event Data," filed on Nov. 13, 2020, which is hereby incorporated by reference in its entirety and for all purposes, includes further methods and circuitry for detecting harsh events. In addition, or as an alternative, to detection of harsh events, the vehicle device 114 advantageously executes one or more event models (e.g., neural networks) on sensor data, such as video data, to detect safety events, such as a tailgating, forward collision risk, and/or distracted driver event.

In some embodiments, the neural networks that are executed for detection of safety events at the vehicle device are optimized for low latency, high recall, and low precision, whereas neural networks that are executed at the event analysis system may be optimized for higher precision. Thus, the neural networks executed on the vehicle device are optimized to be executed in real-time (e.g., low latency), to have a high proportion of actual positives identified correctly (e.g., high recall), and to not be overly concerned with the proportion of positive identifications that were actually correct (e.g., low precision). Accordingly, the outputs of the neural networks at the vehicle device may be provided in substantially real-time to the actual occurrence of a detected event, such that an alert and/or other preventative actions may be taken to minimize further risks. In contrast, the neural networks that are executed at the event analysis system do not typically have the same time pressure and the event analysis system includes significantly more processing power and bandwidth. Accordingly, in some embodiments neural networks for detecting safety events may be trained at the event analysis system for use with the low latency, high recall, and low precision constraints associated with the vehicle device, and provided to the vehicle device periodically and/or when significant updates to the neural network are made.

In some embodiments, the event detection models executed at the vehicle device are performed on down-sampled images from the video feed. For example, a portion of the outward-facing video feed, such as a 300×300 pixel area of the 1920×1080 pixel video, may be extracted from the video feed to enable the low latency analysis needed to provide real-time alerts at the vehicle device. The extracted portion may change in size or position over time, such as in response to a periodic analysis of a frame of the video image to detect features of interest. In some embodiments, the additional asset data is periodically transmitted to the event analysis system, regardless of detection of safety events. For example, in some implementations a still image from the outward-facing video camera may be transmitted to the event analysis system every two minutes. Such additional asset data may be used in training the neural networks.

In some embodiments, the event detection settings, such as criteria and/or thresholds for detection of a safety event, may be determined by user configurable settings, allowing the user (e.g., an owner or manager of a fleet) to either use defaults based on vehicle type (e.g., passenger, light duty, or heavy duty), or to set custom combinations of conditions that are necessary for triggering of an event by the event detection models executed on the vehicle device. These event detection settings may be used in generation of event detection models, e.g., incorporated into the training data that is provided to a neural network, and/or applied algorithmically, e.g. as rules, to sensor data. For example, in some implementations event detection models are configured to detect conditions indicative of a safety event by processing video data, and to output an indication of any detected event along with a confidence level of event detection. These outputs from the neural network, along with other metadata and/or asset data, may then be used to evaluate user—configured event detection settings.

Figure 3:
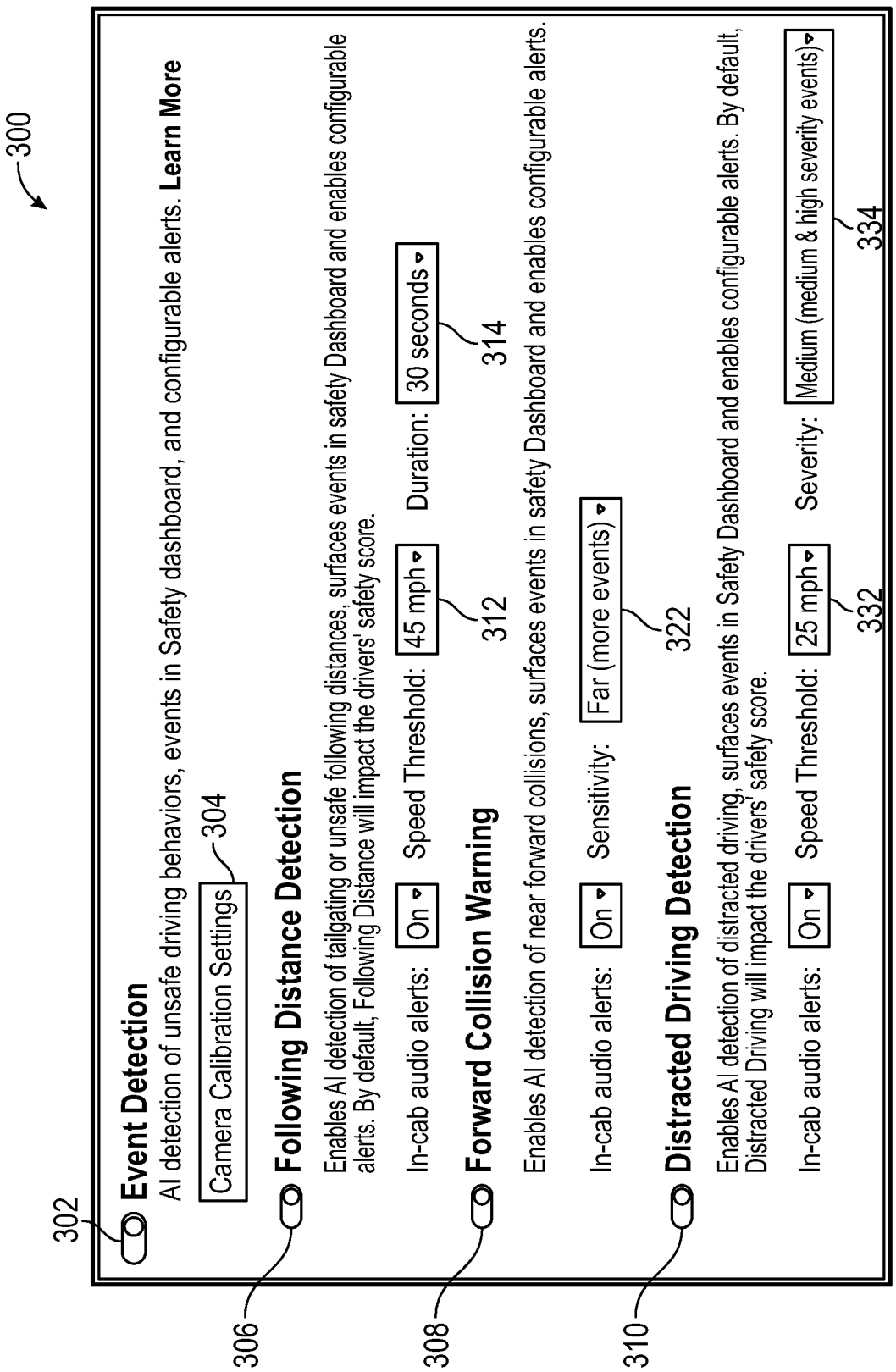
FIG. 3 is an example user interface that may be accessed by a user to designate event detection settings for a particular vehicle or group of vehicles (e.g., a fleet of similar delivery trucks).

In some embodiments, a user may set event detection settings via the safety dashboard 132. FIG. 3 is an example user interface 300 that may be accessed by a user to designate event detection settings for a particular vehicle or group of vehicles (e.g., a fleet of similar delivery trucks). In this example, the user may select settings for each of a tailgating, forward collision, and distracted driving safety events. An event detection control 302 is configured to allow the user to turn event detection off and on. Additionally, camera calibration settings may be accessed via button 304. Execution of event models for detection of each type of safety event may be independently turned on and off, via the tailgating control 306, forward collision control 308, and distracted driving control 310.

In the example of FIG. 3, the tailgating settings include an option to enable in-cab audio alerts (that are delivered via the vehicle device 114), set a minimum speed threshold 312 at which the vehicle must be traveling for the tailgating safety event to be triggered, and a duration 314 for which the tailgating conditions must be met for alert to trigger. Thus, the example settings shown in FIG. 3 would trigger and an in-cab audio alert in response to detection of a tailgating condition (e.g., a distance to a car in front of the vehicle, a "leading vehicle," is determined, such as by analysis of video data, to be less than a threshold distance or travel time) for 30 seconds while the vehicle is moving at a speed of 45 MPH or more. In some implementations, additional settings for the tailgating event may be user configurable, such as a minimum distance and/or travel time between the vehicle and a leading vehicle, cool-off time period from triggering an alert until another alert is triggered, asset data to be transmitted to the event analysis system in response to triggering of a tailgating safety event, and/or any other available sensor data. In some embodiments, the cool-off time period may be reset when the lead vehicle changes. Thus, multiple tailgating events may be triggered within the cool-off time period (e.g., 5 minutes) because the time period is reset each time the lead vehicle changes.

Figure 4:
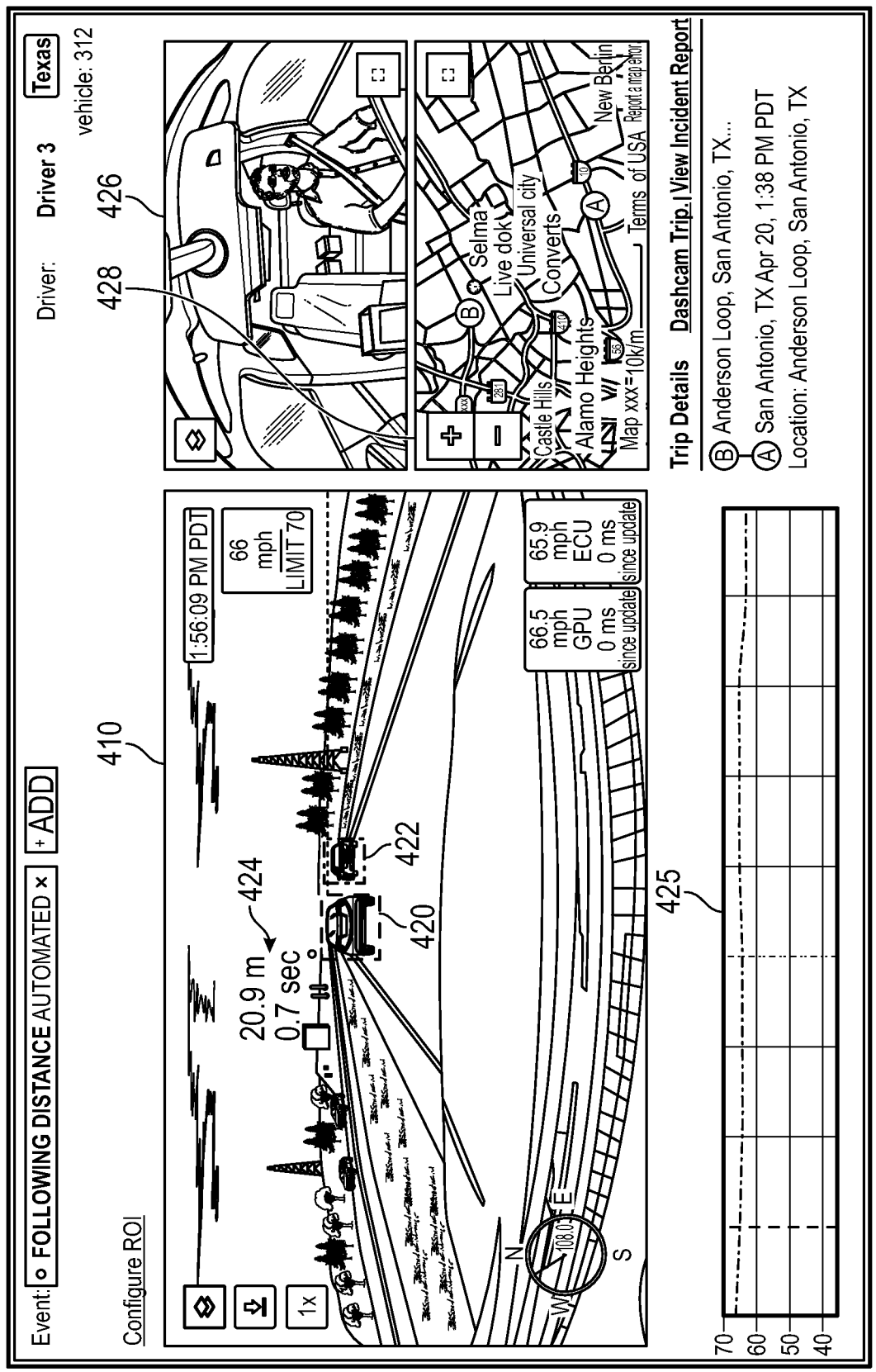
FIG. 4 is an example user interface that may be provided to the user as part of the safety dashboard, such as via a web enabled interface that is viewed on a desktop, portable, or mobile device.

FIG. 4 is an example user interface that may be provided to the user as part of the safety dashboard, such as via a web enabled interface that is viewed on a desktop, portable, or mobile device. This example user interface illustrates asset data associated with a tailgating alert. In some embodiments, certain metadata is transmitted to the event analysis system immediately upon detection of a safety event, such that a safety manager may immediately be alerted of a situation where action may be prudent. Certain asset data associated with the alert, such as video files and/or other larger asset data, may be transmitted to the event analysis system sometime after the safety event has triggered, such as when cellular communication bandwidth is available for transmission of video data. In some embodiments, asset data may be transmitted to the event analysis system in response to requests for specific asset data from the event analysis system.

In the example of FIG. 4, a video replay window 410 is configured to a play back a portion of video data associated with the detected tailgating event, in this embodiment with certain metadata superimposed on the video. For example, in this embodiment the metadata shows bounding boxes 420, 422 indicating objects identified by the feature detection neural network executed by the vehicle device and/or event analysis system. Additionally, for the lead vehicle in bounding box 420, following distance 424 is indicated in meters and travel time. Thus, the viewer of the video can monitor how closely the vehicle follows a leading vehicle throughout the duration of the video clip, such as a 20 second video segment preceding the triggered alert. A speed chart 425 shows the speed of the vehicle throughout the recorded video segment. The example dashboard view in FIG. 4 also includes video 426 from the inward-facing camera and a map 428 that may show position of the vehicle on the map (e.g., with a bright colored dot) moving in conjunction with both the outward-facing video 410 and the inward-facing video 426. Additionally, a slider or other indicator may move along the speed chart 425 in sync with movement of the videos and vehicle placement on the map.

Returning to FIG. 3, a user may configure settings for providing an in cab audio alert, as well as the sensitivity 322 for providing forward collision alerts. In some embodiments, other settings for forward collision alerts may be customized, such as whether alerts are triggered during daytime and/nighttime modes, details for detecting whether a collision course with a leading vehicle is likely, whether turning or deceleration impacts triggering of an alert, a minimum speed threshold, a minimum time to collision threshold, a cool-off time period, and/or any other available sensor data. In some embodiments, default settings may be configured to trigger a forward collision warning event only if night mode is enabled, a forward collision is likely (e.g., a neural network executed on the vehicle device reaches a confidence level for certainty that a forward collision is likely, such as based on analysis of video and/or other sensor data), the vehicle is not currently turning or decelerating, the vehicle is traveling above a minimum speed threshold, a time to collision threshold has been passed, and a forward collision warning alert has not been triggered within a cool-off time period. In other embodiments, other combinations of these criteria and/or other criteria may be set as defaults and/or user configurable. Similar to the tailgating safety event discussed above, a safety dashboard may provide video and other asset data associated with a triggered forward collision warning event in a similar manner as illustrated in FIG. 4.

With reference to the distracted driving safety event 310, in this example the user may customize settings for providing an in cab audio alert, a speed threshold 332, and a severity setting 334. In this example, an in-cab audio alert would be provided in response to the vehicle traveling at a speed of 25 MPH or more when a medium or severe distracted driver condition is detected (e.g., a confidence level of a districted driver condition output by a neural network analyzing inward-facing video of the driver exceeds a medium threshold level). In some embodiments, default settings may be configured to trigger a distracted driving safety event by detecting the pose of the driver's head and determining a difference (e.g., in degrees up or down and/or left or right) from a straight ahead head pose for the driver. In some embodiments, each driver's straight ahead head pose (e.g., the 0 degrees head pose) is initially calibrated by the vehicle device so that the differences with head poses that are calculated during driving are more accurately tuned to the particular driver.

In some embodiments, the distracted driving event detection model is configured to trigger an alert if the head pose angle (e.g., current head pose minus straight ahead head pose for the driver) is larger than a configurable threshold, such as 20 degrees. In some embodiments, the alert may only be triggered if a confidence level associated with the head pose angle exceeds a threshold, such as an 80% confidence level. Additionally, the distracted driver safety event may be configured to only trigger after the head pose angle and confidence level exceed the threshold levels for a minimum time period, such as 5 seconds. In some implementations, when a distracted driver alert is triggered, causing an in-cab alert to sound, modified event detection settings are applied to monitor whether the driver has remedied the distracted (or potentially drowsy) driving condition. For example, in some embodiments the driver is considered distracted until they have altered their head pose to less than a lower head pose angle (e.g., less than 12.5 degrees), perhaps for a threshold time period.

Figure 5:
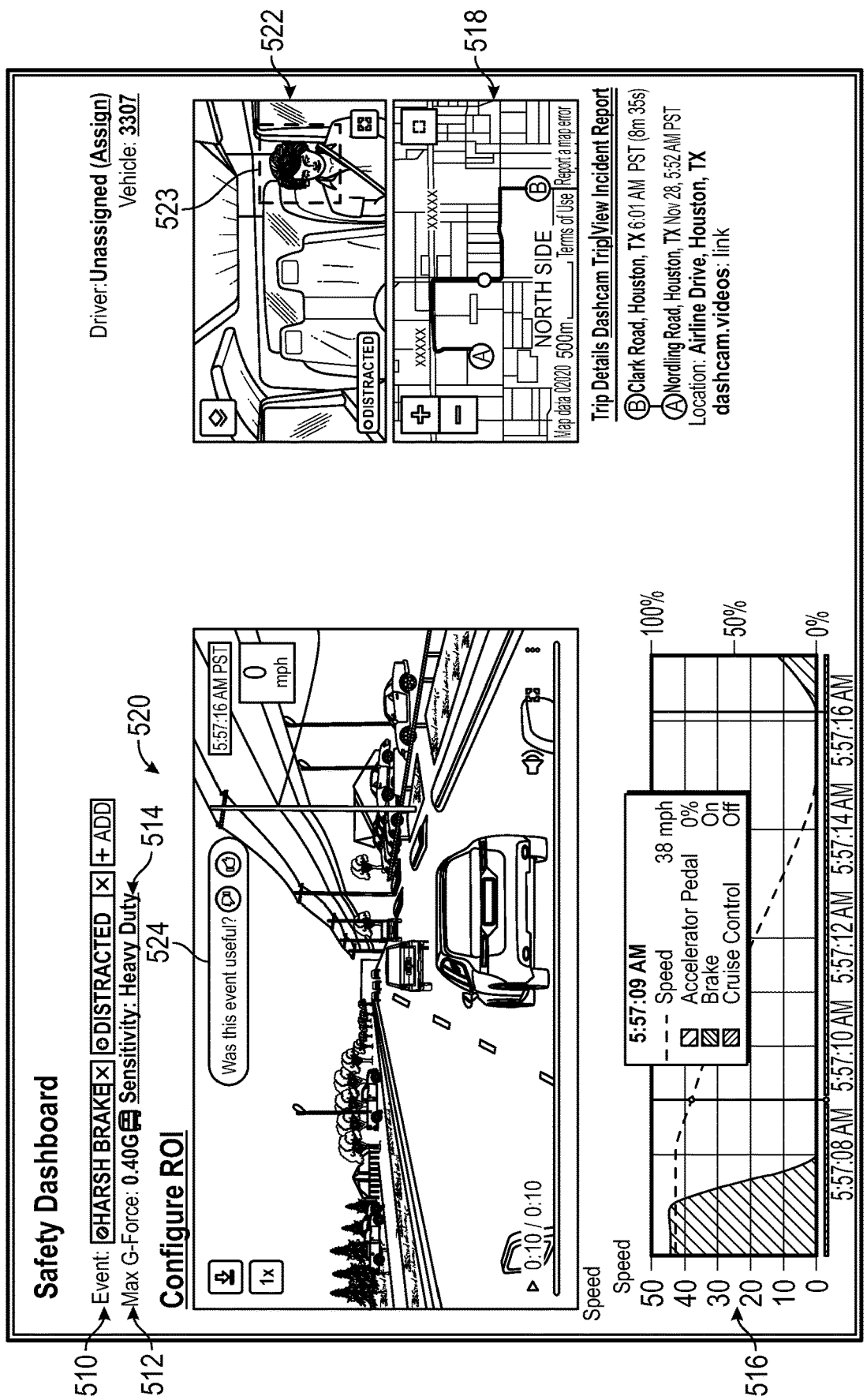
FIG. 5 is an example user interface that provides information regarding a detected safety event, in this case a harsh braking and a distracted driver event.

FIG. 5 is an example user interface that provides information regarding a detected safety event, in this case a harsh braking and a distracted driver event. The example user interface includes both event metadata and asset data, and provides an option for the user to provide feedback on whether the provided alert data was helpful. In this example, the event type 510 is indicated as both a harsh braking and a distracted driver safety event. Additionally, the dashboard provides the maximum G force 512 detected during the event, as well as the default vehicle type setting used in detecting the events. In this example, a time series graph 516 of certain metadata associated with the detected events is illustrated. The charted metadata in graph 516 includes speed, accelerator pedal usage, brake activation indicator, and cruise control activation indicator. In other embodiments, other metadata may be charted, such as based on user preferences. In the example of FIG. 5, metadata indicating location of the vehicle (e.g., GPS data) before and after the detected event is provided in a map view 518 and video data associated with the detected event is provided in outward-facing video 520 and inward-facing video 522. As shown in video 522, a bounding box 523 may be indicated around the driver's head. As the video plays, the bounding box may change colors and/or other visual characteristics at the time when the distracted driver event is triggered to indicate to the viewer when the distracted driving criteria have been met.

In the example of FIG. 5, the user interface brings together not only the initial metadata that was transmitted by the vehicle device after detection of the safety event, but subsequent asset data that were requested by the event analysis system. In some embodiments, the displayed data is synchronized, such that each of the outward-facing video 520, inward-facing video 522, map view 518, and time series graph 516 each depict information associated with a same point in time (e.g., a particular time during the ten seconds of event data associated with a detected safety event). As noted above, the user may interact with pop-up 524 to provide feedback to the event analysis system that may be used in updating and/or optimizing one or more event models.

Figure 6:
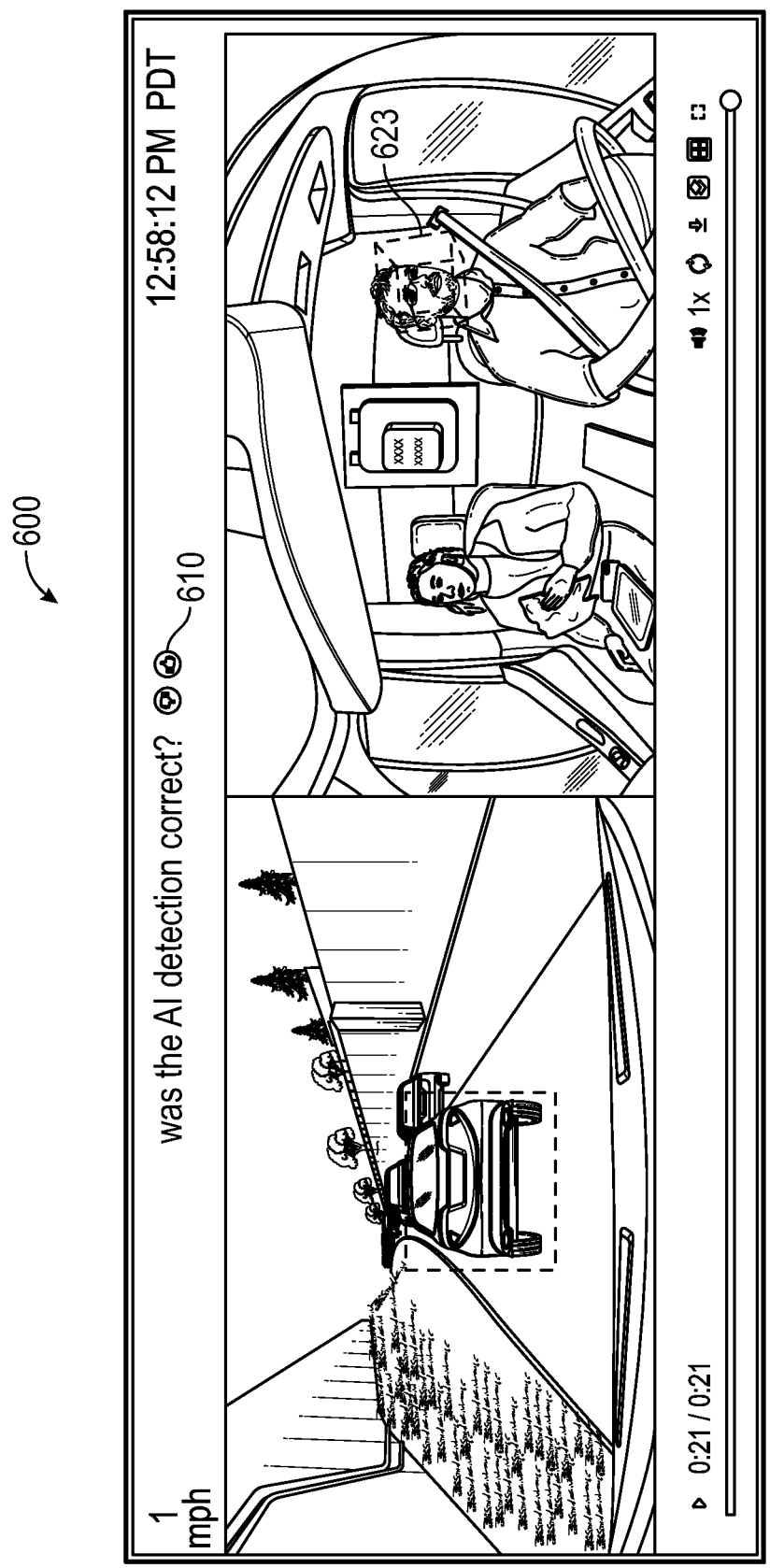
FIG. 6 provides another example user interface that may be provided as part of a safety dashboard, either as a separate user interface and/or as part of another user interface.

FIG. 6 provides another example user interface 600 that may be provided as part of a safety dashboard, either as a separate user interface and/or as part of another user interface, such as to replace video 520 and/or 522 of FIG. 5. In this example, a 3D bounding box 623 is overlaid on the detected driver of the vehicle and, similar to as discussed above, may change visual characteristics when a distracted driver event is triggered. This example, the user may provide feedback 610, in the form of a thumbs up or thumbs down, to indicate whether the distracted driver detection indicated in the video is accurate. For example, an indication of an accurate detection of a distracted driver event may cause the event data to be used as positive training data for updating a neural network configured to detect distracted driver events, while an indication of an inaccurate detection of a distracted driver event may cause the event data to be used as negative training data for updating the neural network. The neural network may be trained at the event analysis system and periodically provided to the vehicle device for improved detection of safety events.

Returning to FIG. 2, at block 212, if a safety event has been triggered the method continues to block 214 where an in-vehicle alert 214 is provided within the vehicle and event data associated with the event is identified and transmitted to the event analysis system (block 216). The in-vehicle alerts may be customized, such as based on the type of triggered event, severity of the event, driver preferences, etc. For example, in-vehicle alerts may include various audible signals and/or visual indicators of triggered safety events.

Figure 7:
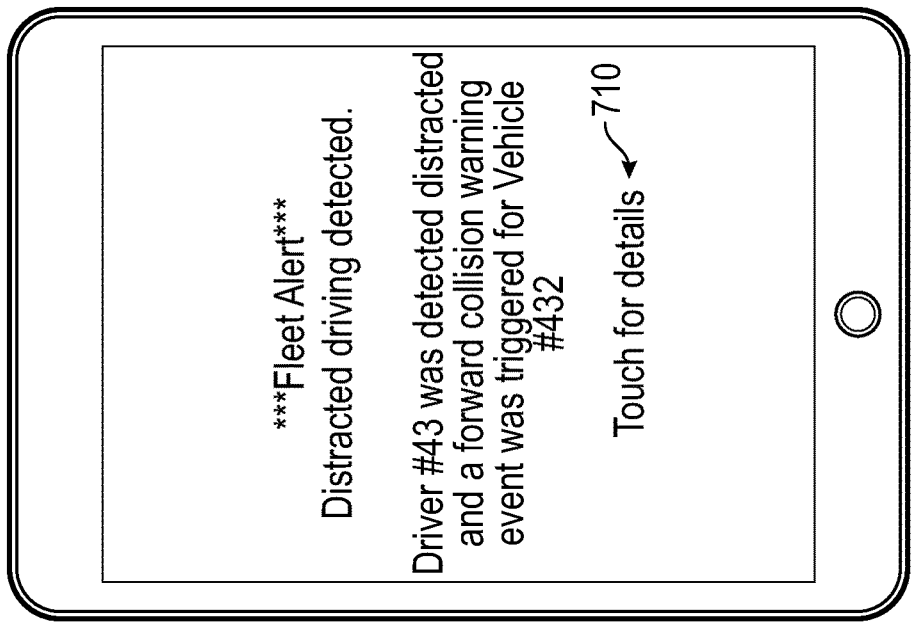
FIG. 7 illustrates an alert that may be transmitted to a user's mobile device to indicate that a distracted driving event in the vehicle was detected.

In some embodiments, alerts may also be transmitted to one or more devices external to the vehicle at block 214. For example, FIG. 7 illustrates an alert that may be transmitted to a user's mobile device to indicate that a distracted driving event in the vehicle was detected. In this example, the user may be a fleet manager, safety manager, parent or guardian of the driver, or the like, that receives the alert and may take action to ensure that the distracted driving condition is remedied. The alert may be delivered via SMS, text message, or application-specific alert, or may be delivered via the safety dashboard, email, and/or via any other communication medium.

Figure 8:
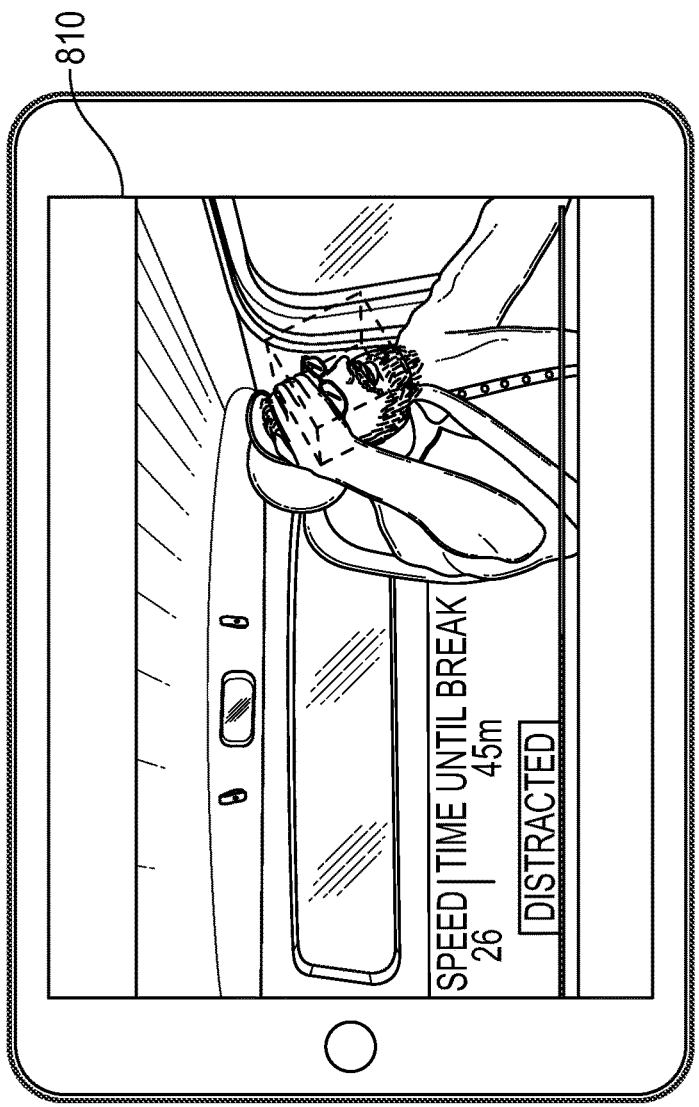
FIG. 8 is an example user interface showing a video clip from the inward-facing camera indicating that a distracted driving event has been detected.

In the example of FIG. 7, the user may select the link 710 to update the user interface to include further event data, such as a video clip 810 shown in the example user interface of FIG. 8. As shown in the example of FIG. 8, a video clip from the inward-facing camera shows the driver as the distracted driving event is detected. This additional event data may be useful for the reviewing user to decide what actions, if any, to take in an effort to reduce risks associated with the detected event. For example, the user may decide to call the driver and discuss the distracted driving condition, which may result in the driver changing course, taking a break, etc. Other event data, such as any of the event data illustrated in the user interfaces of FIGS. 4-6 may be provided to the user receiving a real-time alert from the vehicle device.

In some embodiments, metadata transmitted to the event analysis system may include data from one or more external sources, such as traffic or weather data, which may be helpful in making better determinations of camera obstruction or harsh events, for example. In some implementations, the artificial intelligence executed at the vehicle device and/or event analysis system performs feature detection that produces metadata indicating traffic and/or weather conditions, such as by analyzing video data from the outward-facing camera.

In some implementations, the event data 219 that is transmitted to the event analysis system upon detection of a driver assistance alert, such as based on neural network analysis of video data, may include metadata and only a limited (or no) other asset data. In some embodiments, event data that is transmitted to the event analysis system is selected based on settings of the triggered safety event. For example, a first safety event may indicate that certain metadata is transmitted to the event analysis system, while a second safety event may indicate that certain metadata and asset data, such as one or a few still images associated with the detected event, are transmitted upon detection of the event. For example, metadata that is transmitted to the event analysis system may include location of the object that triggered the event, such as the lead vehicle in the case of a forward collision warning or tailgating, or the head of the driver in the case of a distracted driver event, severity of the event, such as based on rules like duration of the event, distance to the lead vehicle, etc. Metadata may further include information about other vehicles or objects within the field of view of the cameras, such as speed of other vehicles, head pose information (in the case of a distracted driver event), position and/or movement of the driver's hands (e.g., coordinates, width, height) in the case of a hand-related policy violation, type of hand related policy violation (e.g., car the user's hands on a phone, eating, drinking, smoking, or empty), and/or confidence level associated with the detected type of hand-related policy violation. For other policy violations associated with an object, metadata transmitted at block 216 may include the type of event (e.g., not wearing seatbelt violation) and number of times the driver was alerted of the policy violation previously.

In some embodiments, the vehicle device executes rules (or event models in other formats) that determine whether even the metadata is transmitted to the event analysis system. For example, a rule may indicate that triggering of a particular event type that has not been detected during a predetermined time period (e.g., a cool-off time period) should not initiate transmission of event data 219 to the event analysis system. Rather, the rule may indicate that the in-vehicle alert 214 is provided to the driver as a "nudge" to correct and/or not repeat actions that triggered the safety event. The rules may further indicate that occurrence of the same safety event within a subsequent time period (e.g., 1 minute, 30 minutes, 60 minutes, etc.) causes event data 219 regarding both of the detected events to be transmitted to the event analysis system. Similarly, rules may be established to transmit event data 219 only upon occurrence of other quantities of safety events (e.g., three, four, five, etc.) during other time periods (e.g., 30 seconds, 2 minutes, 10 minutes, 20 minutes, 60 minutes, two hours, four hours, etc.). Such rules may further be based upon severity of the triggered safety events, such that a high severity safety event may be transmitted immediately (and perhaps with additional asset data) to the event analysis system, while a low severity safety event may only be transmitted once multiple additional low severity events are detected (and perhaps with no or limited asset data). As another example, in some implementations asset data may be transmitted in a "roll up" of asset data associated with multiple events (e.g., all events or events of a certain severity) during a certain period of time, such as during a work shift of the driver or a particular trip. In such an embodiment, there may be rules for exceptions to the roll up rule, such as to transmit asset data for a serious or egregious safety event separately and immediately. In some embodiments, the video data (and/or other types of asset data) may be compiled into a single video file that includes all of the detected events throughout the roll up time period. Thus, rather than the event analysis system receiving tens or hundreds of video files associated with tens or hundreds of safety events during a driver's shift, the event analysis system may receive a single video file that is a hyper-lapse showing frames from all of the safety events. In some embodiments, a hyper-lapse video may be compiled for particular types of events, e.g., all of the distraction type safety events are included in a first video file and all tailgating video may be included in a second video file.

In some embodiments, the idea of providing nudges to a driver, prior to or instead of transmitting an event detection to the event analysis system, may allow the driver to correct the actions leading to the knowledge. For example, the driver may receive a nudge indicating that the driver is tailgating a lead vehicle. In response, the driver may increase a distance between the vehicle and the lead vehicle to alleviate the tailgating condition. Thus, this corrected action taken by the driver may later be seen by a safety manager, for example, as a positive event for the driver (e.g., because the driver corrected their behavior in response to a nudge) rather than a negative event (e.g., the initial tailgating of a leading vehicle).

In some embodiments, asset data, such as video and audio data, are recorded in the sensor data store 206, even though such asset data may not be transmitted to the event analysis system initially upon triggering of a safety event (e.g., at block 216). In some implementations, the asset data may be later transmitted when the communication link supports transmission of the asset data, such as when the vehicle is within a geographic area with a high cellular data speed. Alternatively, the asset data may be transmitted when connected on a nightly basis, such as when the vehicle is parked in the garage and connected to Wi-Fi (e.g., that does not charge per kilobyte). Accordingly, the vehicle device advantageously provides immediate in-vehicle alerts upon detection of a safety event, while also allowing the event analysis system to later receive asset data associated with the detected safety events, such as to perform further analysis of the events (e.g., to update event models applied by the vehicle device) and/or to include certain asset data in a safety dashboard.

In some embodiments, once a particular asset data is transmitted to the event analysis system, that particular asset data is removed from the sensor data store 206 of the vehicle device. For example, if a five second video clip associated with a detected safety event is transmitted to the event analysis system that five second portion of the video stream may be removed from the sensor data store 206. In some embodiments, asset data is only deleted from the vehicle device when event analysis system indicates that the particular asset data may be deleted, or until the asset data has become stale (e.g., a particular asset data is the oldest timestamped data in the sensor data store 206 and additional storage space on the sensor data store 206 is needed for recording new sensor data).

In the embodiment of FIG. 2, the event analysis system receives the event data 219, which may initially be only metadata associated with a detected event, as noted above, and stores the event data for further analysis at block 210. For example, at block 210 high-fidelity event detection models, such as higher precision neural networks than are executed on the vehicle device, may be executed to determine whether the triggered event was accurately detected. For example, event data associated with a tailgating event may be analyzed using a tailgating model in the event analysis system that is more sophisticated than the tailgating model used in the vehicle device. For example, the event models applied in the event analysis system may take as inputs additional sensor data, such as full frame video data, in detecting occurrence of safety events. Thus, the event models applied in the event analysis system may require additional event data beyond the initial event data received upon triggering of the safety event at the vehicle device. Accordingly, in the embodiment of FIG. 2, the event analysis system at block 225 determines if additional event asset data is needed to execute the event analysis system event model. Additionally, the event analysis system may determine that additional asset data is needed for a safety dashboard, such as to provide further information regarding a detected event that is more useful to a safety manager. For example, audio data that was not part of the initial event data transmitted to the event analysis system may be indicated as required for a particular detected event type. Thus, the event analysis system may determine that a particular time segment of audio data should be requested from the vehicle device.

At block 230, additional event data is requested from the vehicle device, which may fulfill the request by transmitting additional event data 219 immediately and/or at some later time in accordance with rules for transmitting additional data, such as to conserve cellular data bandwidth and transmission costs. In some embodiments, specific asset data is requested by the event analysis system, such as a particular time period of requested video or audio data, minimum and/or maximum resolution, and frame rate, file size, etc. Upon receipt of the additional event data 219 at the event analysis system, the high-fidelity event models 210 may be further executed and/or trained based on both the original event data and the additional event data. This process may be repeated multiple times until the event data needed to evaluate the event analysis system models and/or meet the minimum requirements for a safety dashboard is provided.

In some embodiments, the event analysis system applies default and/or user configurable rules to determine which asset data is requested from the vehicle device. For example, a rule may be established that excludes requests for additional asset data when asset data for the same type of safety event has already been received during a particular time period. For example, the rules may indicate that asset data is requested only for the first 5 occurrence of harsh turning events during a working shift of a driver. Thus, the event analysis system receives additional asset data for some of the harsh turning events and preserves bandwidth and reduces costs by not requesting asset data for all of the harsh turning events, due to the limited value of analyzing the additional asset data associated with a recurring triggered safety event.

In some embodiments, execution of event models at the event analysis system comprises training one or more event models for better detection of the determined event type. For example, in some embodiments the event analysis system evaluates asset data that was not considered by the vehicle device in triggering the initial safety event. The event analysis system may provide suggestions and/or may automatically update event models that are restricted to analysis of certain event data (e.g., event metadata and/or certain types of asset data) based on analysis of asset data that is not analyzed by the updated event model. For example, analysis of video data associated with a safety event may identify correlations between features in the video data and acceleration data that may be used to update criteria or thresholds for triggering the particular safety event by the vehicle device. Advantageously, the event analysis system may consider event data across massive quantities of vehicles in determining updates to the event models that are executed on the vehicle device.

As noted above, event models may include neural networks that are updated over time to better identify safety events. Thus, event data may become part of a training data set for updating/improving a neural network configured to detect the safety event. As noted above, a number of diverse types of algorithms may be used by the machine learning component to generate the models. The machine learning algorithms can be configured to adaptively develop and update the models over time based on new input received by the machine learning component. For example, the models can be regenerated on a periodic basis as new received data is available to help keep the predictions in the model more accurate as the data is collected over time. Also, for example, the models can be regenerated based on configurations received from a user or management device (e.g., 130).

The safety dashboard that is provided at block 235 may include an option for the user to provide feedback on accuracy of the detected events, such as an indication of whether the safety event actually occurred or if the triggering event should be considered a false positive. Based on this user feedback, the event models may be updated at block 210, potentially for transmission back to the vehicle device as part of event model updates.

Machine Learning Model Feedback Loop

As discussed above, the vehicle device (e.g., a vehicle gateway device) may be in communication with a backend server. Each of the vehicle device and the backend server may implement a respective machine learning model trained to identify the occurrence of a particular feature within received sensor data and/or to identify an event based on the occurrence of the particular feature. For example, the vehicle device and the backend server may each implement a respective machine learning model to identify whether a user of a vehicle is associated with a particular hand action, a particular head pose, etc.

Based on the identified feature, the vehicle device and the backend server (e.g., via machine learning models) may identify events of interest, such as safety events. For example the event may include a distracted driving event. The vehicle device may implement a resource-lite version of a machine learning model to provide an efficient and timely prediction (e.g., realtime or substantially realtime) of whether the sensor data is associated with the occurrence of the particular feature and/or occurrence of the event. Further, the backend server may implement a more resource-intensive version of the machine learning model (e.g., based on the resources available at the backend server) to provide a more accurate prediction of whether the sensor data is associated with occurrence of the particular feature and/or occurrence of the event. In some embodiments, the vehicle device and the backend server may implement different versions of the same machine learning model (e.g., the vehicle device may implement a "lite" version of the machine learning model and the backend server may implement an "intensive" version of the machine learning model). In other embodiments, the vehicle device and the backend server may implement different machine learning models. For example, the vehicle device and the backend server may each implement machine learning models trained to identify the occurrence of the features and/or the occurrence of the event, however, the vehicle device may implement a machine learning model that uses less operations (e.g., less resources, less components, less calculations, etc.) as compared to the machine learning model implemented by the backend server.

The vehicle device and the backend server may each implement a respective machine learning model and identify a probability of an occurrence of a particular feature. Further, the vehicle device and the backend server may each implement a respective machine learning model and identify a probability of an event based on the probability of the occurrence of a particular feature. The backend server may transmit the probability (e.g., the probability of the occurrence of the particular feature and/or the probability of the event) determined by the backend server to the vehicle device. Further, the vehicle device may compare the probability determined by the backend server and the probability (e.g., the probability of the occurrence of the particular feature and/or the probability of the event) determined by the vehicle device. The vehicle device may compare the probabilities in order to determine an accuracy of the probability determined by the vehicle device. In some embodiments, the vehicle device may transmit the probability determined by the vehicle device to the backend server and the backend server may compare the two probabilities. Further, the backend server may provide an indication of the comparison of the two probabilities to the vehicle device.

The vehicle device and/or the backend server may compare the probabilities in order to identify whether the probability determined by the vehicle device is accurate. For example, the vehicle device and/or the backend server may compare the probabilities in order to identify false positives and/or true positives determined by the vehicle. The vehicle device and/or the backend server may utilize a plurality of methods of comparison.

In some embodiments, the vehicle device may identify a prediction number associated with the vehicle device, the vehicle, a user of the vehicle, etc. The prediction number may be a specification (e.g., a range, a threshold, etc.) for determining whether a particular feature and/or a particular event has occurred. For example, the prediction number may identify a 70% threshold probability for determining that a particular event has occurred. If the determined probability is below the threshold probability, the vehicle device may determine the feature and/or the event has not occurred and if the probability is above and/or equal to the threshold probability, the vehicle device may determine the feature and/or the event has occurred. In some embodiments, if the probability is below and/or equal to the threshold probability, the vehicle device may determine the feature and/or the event has not occurred and if the probability is above the threshold probability, the vehicle device may determine the feature and/or the event has occurred.

Further, the vehicle device may compare the probability determined by the vehicle device and the probability determined by the backend server with the threshold probability. For example, the vehicle device may determine whether the probability determined by the vehicle device and the probability determined by the backend server match relative to the threshold probability. Further, the vehicle device may determine whether both of the probabilities are greater than the prediction number or less than the prediction number. For example, if both probabilities are greater than the prediction number or less than the prediction number, the vehicle device may determine that the probability determined by the vehicle device is accurate and if one of the probabilities is greater than the prediction number and one of the probabilities is less than the prediction number, the vehicle device may determine that the probability determined by the vehicle is not accurate.

In some embodiments, the vehicle device may compare the probability determined by the vehicle device and the probability determined by the backend server with a threshold range. For example, the threshold range may identify a maximum difference between the probability determined by the vehicle device and the probability determined by the backend server. If the vehicle device determines the range between the probability determined by the vehicle device and the probability determined by the backend server exceeds the threshold range, the vehicle device may determine that the probability determined by the vehicle device is not accurate and if the vehicle device determines the range between the probabilities does not exceed the threshold range, the vehicle device may determine that the probability determined by the vehicle device is accurate. For example, if the threshold range is 10%, the probability determined by the vehicle device is 75%, and the probability determined by the backend server is 50%, the vehicle device may determine the range between the probabilities exceeds the threshold range and determine the probability determined by the vehicle device is inaccurate.

Based on identifying the probability determined by the vehicle device, the vehicle device can implement one or more operations to adjust how the vehicle device identifies events. For example, the vehicle device can implement a backoff algorithm to adjust the wait period between subsequent attempts to identify events (e.g., the vehicle device can implement a progressively longer wait period between attempts to identify events based on determining the vehicle device is identifying false positives). Further, the vehicle device can tune the threshold numbers for identifying events (e.g., the vehicle device can dynamically adjust the threshold range and/or the threshold probability). Further, the vehicle device can train and implement another machine learning model to identify the false positives based on the probabilities determined by the machine learning model of the vehicle device (e.g., the vehicle device can train a machine learning model to identify false positives by providing an input of factors associated with the determination of the probability as an input and the output of the machine learning model of the backend server as an expected output).

Comparison of Event Analysis by the Vehicle Device and Event Analysis System

Figure 9:
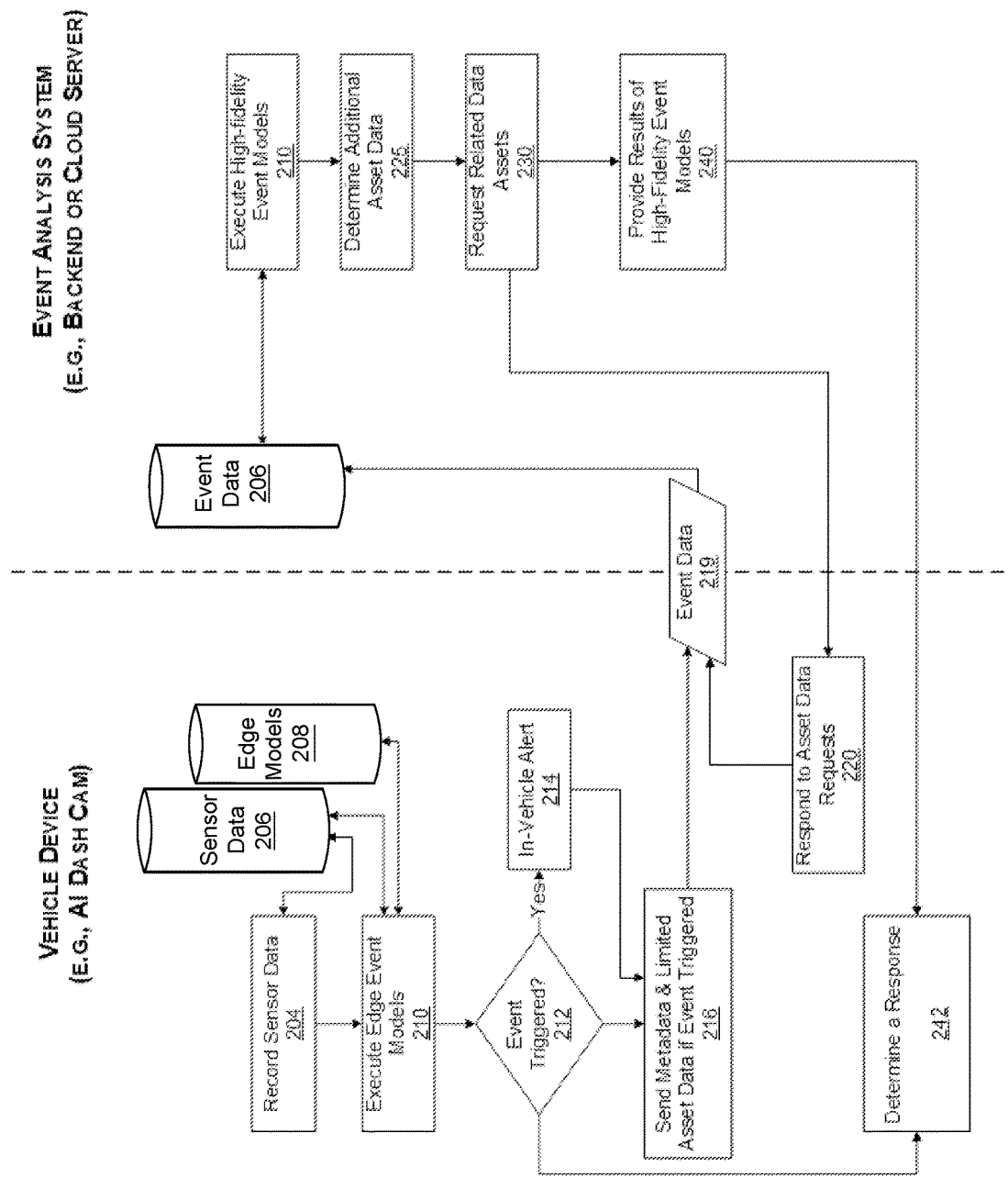
FIG. 9 is an example flow diagram illustrating an example process for comparing the output of the vehicle device and the output of a backend server.

FIG. 9 is a flow diagram illustrating an example process for the vehicle device to detect safety events (e.g., a distracted state of a driver), such as by processing video data using one or more neural networks, and selectively communicating event data to an event analysis system. In general, the processes illustrated on the left are performed by the vehicle device, while processes on the right are performed by an event analysis system (e.g., the backend server). Each of the vehicle device and the event analysis system may implement machine learning models to identify the occurrence of particular features based on obtained sensor data. Further, each of the vehicle device and the event analysis system may implement machine learning models (e.g., the same or different models from the models used to identify the occurrence of particular features) to identify events. As discussed above, the machine learning models implemented by the vehicle device may be optimized for low latency, high recall, and low precision and the machine learning models implemented by the event analysis system may be optimized for accuracy and/or performance. Depending on the embodiment, however, the processes may be performed by different devices than illustrated, the method may include fewer or additional blocks, and/or the blocks may be performed in an order different than is illustrated.

Blocks 204-230 of FIG. 9 are similar to blocks 204-230 of FIG. 2. As discussed above, beginning at block 204, sensor data (e.g., video data) from one or more sensors (e.g., a camera) may be stored for processing by the vehicle device and/or the event analysis system. The sensor data may include sensor data from multiple sensors and may include sensor data stored in a sensor data store 206.

At block 210, the vehicle device can execute (e.g., implement) edge event models (e.g., one or more machine learning models) based on the recorded sensor data. The vehicle device can obtain the sensor data from the sensor data store 206 and can obtain the machine learning models from an edge models store 208. The vehicle device can obtain the sensor data and/or the machine learning models from a local or a remote data store. In some embodiments, the sensor data and/or the machine learning models may be pushed to the vehicle device (e.g., by a user computing device). The vehicle device may execute the one or more machine learning models by providing the sensor data as input to the one or more machine learning models. Further, the one or more machine learning models may be trained to identify the occurrence of one or more features of a particular object in the sensor data. For example, if the sensor data is associated with a user of the vehicle, the one or more machine learning models may be trained to identify one or more features of the user (e.g., a hand action of the user, a head pose of the user, etc.). Based on the training of the machine learning models and the sensor data, the one or more machine learning models can output a probability of an occurrence of the particular feature. Further, based on the probability of the occurrence of the particular feature, the one or more machine learning models (or separate machine learning models) can output a probability of an event. Therefore, the vehicle device can implement the one or more machine learning models in order to identify the occurrence of a particular feature.

At block 212, the vehicle device may determine if a safety event is triggered based on the probability of the event output by the one or more machine learning models. For example, the vehicle device may compare the probability output by the one or more machine learning models to a prediction number to determine whether the probability satisfies the prediction number. If the vehicle device determines the probability satisfies the prediction number, the vehicle device may determine an event has occurred and if the vehicle device determines the probability does not satisfy the prediction number, the vehicle device may determine an event has not occurred. Therefore, the vehicle device may determine if a safety event has been triggered based on a probability output by the one or more machine learning models.

If the vehicle device determines a safety event has been triggered, at block 214, the vehicle device may generate and/or provide an in-vehicle alert within the vehicle. Further, at block 216, based on identifying the occurrence of a safety event, the vehicle device may send metadata and limited asset data to the event analysis system. The metadata and the limited asset data may include the sensor data associated with the event, the probability determined by the machine learning models of the vehicle device, and/or any other metadata associated with the event. The vehicle device may transmit the metadata and the limited asset data as event data 219. In some embodiments, the vehicle device may send metadata and limited asset data to the event analysis system based on identifying the non-occurrence of a safety event. For example, the vehicle device may periodically or aperiodically send metadata and limited asset data to the event analysis system regardless of whether an event has been identified in order to confirm that the vehicle device is correctly identifying events and correctly identifying non-events (e.g., the non-occurrence of events). Therefore, the vehicle device can send metadata and limited asset data to the event analysis system if an event has been triggered or if an event has not been triggered.

Based on the vehicle device transmitting the event data 219 to the event analysis system, the event analysis system may obtain the event data 219. The event analysis system may store the obtained event data 219. Further, at block 210, the event analysis system can execute (e.g., implement) high-fidelity event detection models (e.g., one or more machine learning models) based on providing the obtained event data 219 as input to the high-fidelity event detection models. The event analysis system can implement the one or more machine learning models to determine whether the machine learning models implemented by the vehicle device are correctly identifying events. Therefore, the event analysis system can execute the one or more machine learning models.

In some embodiments, at block 225, the event analysis system may determine additional asset data in order to implement the one or more machine learning models. The event analysis system may determine whether additional asset data is available for the implementation of the one or more machine learning models and/or the event analysis system may determine whether additional asset data is required for the implementation of the one or more machine learning models. Therefore, the event analysis system can determine additional asset data for implementation of the one or more machine learning models.

At block 230, the event analysis system may request the related data assets based on determining that additional asset data is required and/or available for implementation of the one or more machine learning models. In some embodiments, the event analysis system may request specific related data assets (e.g., a specific portion of audio data). In other embodiments, the event analysis system may request general and/or available related data assets (e.g., audio data associated with the sensor data). At block 220, in response to the request from the event analysis system, the vehicle device may transmit additional event data 219 to the event analysis system. Therefore, the event analysis system can obtain the requested related data assets from the vehicle device.

The event analysis system may obtain the requested related data assets and implement the one or more machine learning models based on the originally obtained event data 219 and the additional event data 219. Based on the implementation of the one or more machine learning models, the event analysis system can obtain results of the high-fidelity event models. At block 240, the event analysis system can provide the results of the high-fidelity event models to the vehicle device. The results of the high-fidelity event models can include a probability of an occurrence of a particular feature associated with one or more objects of the sensor data and/or a probability of an event. Further, the probability of the occurrence of the particular feature and/or the probability of the event may be associated with a particular time period, a particular frame, etc.

In some embodiments, the event analysis system may receive the output of the one or more machine learning models of the vehicle device (e.g., a first probability). Further, the event analysis system can compare the output of the one or more machine learning models of the vehicle device with the output of the one or more machine learning models of the event analysis system (e.g., a second probability). The event analysis system may compare the outputs (e.g., the probabilities) to determine if the outputs correspond to each other based on a threshold number (e.g., based on a confidence threshold, a threshold probability, a threshold range, a prediction threshold, or any threshold number). Further, the threshold number for comparison of the outputs may be associated with a particular user, a particular vehicle, a particular vehicle device, etc. For example, the event analysis system can compare the outputs to determine if the outputs are separated by a particular threshold number, if the outputs are both greater or less than a particular threshold number, or any other comparison. Based on this comparison, the event analysis system may determine if the output of the vehicle device is inaccurate (e.g., corresponds to a false positive).

At block 242, the vehicle device may determine a response to the results. In some embodiments, the event analysis system may provide the output of the one or more machine learning models to the vehicle device and the vehicle device may compare the outputs of the vehicle device and the event analysis system to determine if the output of the vehicle device is inaccurate. In other embodiments, as discussed above, the event analysis system may perform the comparison and may provide an indication of the accuracy of the output of the vehicle device to the vehicle device. Based on determining the accuracy of the vehicle device, the vehicle device can determine a response to the results. The response to the results may include an adjustment to how the vehicle device identifies events.

The response to the results may include performing a naïve exponential backoff algorithm. The vehicle device may perform the naïve exponential backoff algorithm to adjust how often the vehicle device analyzes sensor data to identify events. For example, based on the comparison of the output of the vehicle device and the output of the event analysis system, the vehicle device and/or the event analysis system may determine that the vehicle device is identifying false positive events. Therefore, the vehicle device can adjust the time period between analysis of sensor data for identification of events. For example, at a first time, the vehicle device may analyze sensor data every first time period (e.g., every minute) based on an analysis time period. Based on determining the vehicle device has identified one or more false positive events, the vehicle device and/or the event analysis system may adjust the analysis time period such that the vehicle device, at a second, subsequent time, may analyze sensor data every second time period which may have a greater duration than the first time period (e.g., every ten minutes). Therefore, the response to the results may include performing the naïve exponential backoff algorithm.

The response to the results may include tuning the threshold number for identifying events. As discussed above, the vehicle device may identify events based on comparing the probability determined by the one or more machine learning models to a threshold number. Based on the comparison of the output of the vehicle device and the output of the event analysis system, the vehicle device and/or the event analysis system may determine that the vehicle device is identifying false positive events and may adjust the threshold number. The vehicle device and/or the event analysis system may adjust the threshold number (e.g., to increase the threshold number) such that the vehicle device identifies fewer events. In some embodiments, the vehicle device and/or the event analysis system may determine that the vehicle device is identifying true positive events and/or false negative events and may adjust the threshold number (e.g., to decrease the threshold number) such that the vehicle device identifies more events. For example, at a first time, the vehicle device may compare the output of the machine learning models to a first threshold number (e.g., 70%). Based on determining the vehicle device has identified one or more false positive events, the vehicle device and/or the event analysis system may adjust the threshold number such that the vehicle device, at a second, subsequent time, may compare the output of the machine learning models to a second threshold number which may be greater than the first threshold number (e.g., 80%). Therefore, the response to the results may include tuning the threshold for identifying events.

The response to the results may include training a machine learning model based on the output of the event analysis system. Based on the comparison of the output of the vehicle device and the output of the event analysis system, the vehicle device and/or the event analysis system may determine that the vehicle device is identifying false positive event and may train a machine learning model to identify the false positive events. The vehicle device and/or the machine learning model may train a machine learning model by providing characteristics associated with the sensor data (e.g., a confidence score, a duration of detection of the sensor data, a time of day, a weather, a type of vehicle, a user, or any other characteristics associated with the sensor data) as inputs to the machine learning model and may provide the output of the event analysis system as an expected output of the machine learning model. By training the machine learning model, the machine learning model can identify likely false positive events for the vehicle device and the vehicle device may dismiss and/or ignore these likely false positive events. Therefore, the response to the results may include training a machine learning model to identify the likely false positive events based on the determined false positive event.

Example Embodiments of Adjusting Event Detection

Figure 10A:
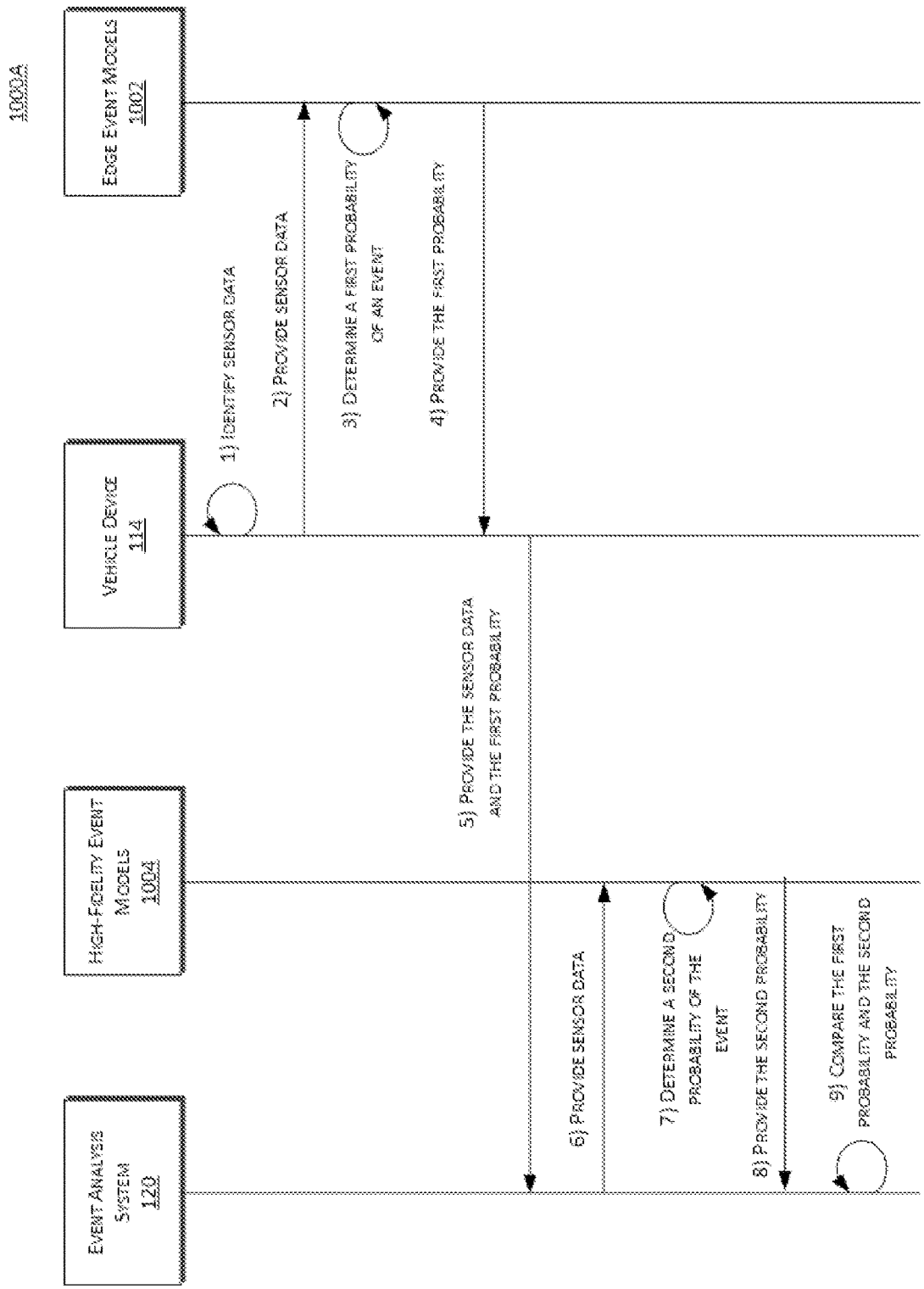
FIG. 10A illustrates an example flow diagram for comparing event probabilities from a vehicle device and a backend server, according to various embodiments of the present disclosure.

FIG. 10A depicts interactions among various components shown in FIG. 2 and FIG. 9 for comparing probabilities of the occurrence of a particular event in accordance with aspects of the present disclosure. The environment 1000A may include various components implemented in a configuration as identified in FIG. 2 and FIG. 9. The environment 1000A may include an event analysis system 120, high-fidelity event models 1004 associated with the event analysis system 120, a vehicle device 114, and edge event models 1002 associated with the vehicle device 114. In some embodiments, the event analysis system 120 may implement (e.g., execute) the high-fidelity event models 1004 and/or the vehicle device 114 may implement (e.g., execute) the edge event models 1002. In other embodiments, a separate system may implement the edge event models 1002 and/or the high-fidelity event models 1004. It will be understood that the environment 1000A may include more, less, or different components.

As shown in FIG. 10A at [1], the vehicle device 114 can identify sensor data. The vehicle device 114 may include one or more sensors (e.g., one or more camera sensors, one or more audio sensors, one or more video sensors, etc.) and the vehicle device 114 may receive the sensor data from the one or more sensors. In some embodiments, the vehicle device 114 may receive the sensor data via a wired or a wireless connection. For example, the vehicle device 114 may receive sensor data via one or more sensors that are integrated into the vehicle device 114 and/or via a network connection. Further, the vehicle device 114 may receive the sensor data as streaming data or as non-streaming data. Therefore, the vehicle device 114 can identify the sensor data.

At [2], the vehicle device 114 can provide the sensor data to the edge event models 1002. For example, the vehicle device 114 may execute the edge event models 1002 to initiate access of the sensor data by the edge event models 1002. The vehicle device 114 may provide the sensor data to the edge event models 1002 in order to detect the probability of an occurrence of a particular event (e.g., a distracted state of a user) based on a probability of one or more features (e.g., head poses, hand actions, etc.) of an object (e.g., a user of a vehicle) based on the sensor data (e.g., camera sensor data). Each of the edge event models 1002 may be trained to identify a probability of an occurrence of such features based on obtained sensor data. Further, each of the edge event models 1002, or separate machine learning models, may be trained to identify an occurrence of the particular event based on the probability of the occurrence of the features. Therefore, the vehicle device 114 can provide the sensor data to the edge event models 1002.

At [3], the edge event models 1002 can determine a first probability of an event. The vehicle device 114 may implement the edge event models 1002 by providing the sensor data as input. Based on the provided sensor data, the edge event models 1002 can determine the first probability of the event. The first probability of the event may identify a first probability that an event has occurred based on the sensor data (e.g., a probability that the user of the vehicle is distracted based on the probability of an occurrence of a particular feature associated with one or more objects of the sensor data). For example, the vehicle device 114 may execute locally stored edge event models 1002 to generate a substantially real time probability that a user of the vehicle is currently distracted. Therefore, the edge event models 1002 can determine a first probability of an event.

At [4], the edge event models 1002 can provide the first probability to the vehicle device 114, for example, as an output of the edge event models 1002 executed by the vehicle device 114. In some embodiments, the edge event models 1002 may provide a first probability for each set of sensor data received from the vehicle device 114. Further, the edge event models 1002 may periodically or aperiodically provide a first probability to the vehicle device 114. In some embodiments, the edge event models 1002 can provide the probability of the occurrence of the particular feature to the vehicle device 114. Therefore, the edge event models 1002 can provide the first probability to the vehicle device 114.

The vehicle device 114 may then evaluate one or more event detection models, using the probabilities generated by the edge event models 1002, to determine probability of a corresponding one or more events. For example, the event detection model may determine whether an event has occurred by comparing the first probability to a threshold number. The vehicle device 114 may periodically obtain the probability and provide the probability to the event detection model to identify events based on a wait period (e.g., every 10 seconds). Therefore, the vehicle device 114 may provide the first probability to the event detection model to determine an occurrence of an event, At [5], the vehicle device 114 can provide the sensor data and the first probability to the event analysis system 120. In some embodiments, the vehicle device 114 may not provide the first probability to the event analysis system 120 and may provide the sensor data without the first probability to the event analysis system 120. In other embodiments, the vehicle device 114 may not provide the sensor data to the event analysis system 120 and may provide metadata and/or event data associated with the sensor. The vehicle device 114 may provide the sensor data and the first probability to the event analysis system 120 based on determining that the first probability exceeds a particular threshold number (e.g., based on identifying an event based on the first probability) using the event detection model. For example, the vehicle device 114 may obtain the first probability and determine that an event has occurred based on the first probability and, in response to the determination that the event has occurred, provide the sensor data and the first probability to the event analysis system 120. In some embodiments, the vehicle device 114 may provide the sensor data and the first probability without determining that an event has occurred. For example, the vehicle device 114 may provide the sensor data and the first probability to the event analysis system 120 based on receiving the first probability from the edge event models 1002. In some embodiments, the vehicle device 114 can provide the probability of the occurrence of the particular feature to the event analysis system 120. Therefore, the vehicle device 114 can provide the sensor data and the first probability to the event analysis system 120.

At [6], the event analysis system 120 can provide the sensor data (or the metadata associated with the sensor data) to the high-fidelity event models 1004, such as may be executed in the cloud. The event analysis system 120 may provide the sensor data to the high-fidelity event models 1004 in order to determine probability of occurrence of the particular event (e.g., a distracted state of the user) based on one or more features (e.g., head poses, hand actions, etc.) of the object (e.g., a user of a vehicle) based on the sensor data. The high-fidelity event models 1004 and the edge event models 1002 may identify separate probabilities of occurrence of a same event. Similar to the edge event models 1002, each of the high-fidelity event models 1004 may be trained to identify a probability of an occurrence of such features based on obtained sensor data. Further, each of the high-fidelity event models 1004, or separate machine learning models, may be trained to identify an occurrence of the particular event based on the probability of the occurrence of the features. Therefore, the event analysis system 120 can provide the sensor data to the edge event models.

At [7], the high-fidelity event models 1004 can determine a second probability of the event. The event analysis system 120 may evaluate the high-fidelity event models 1004 by accessing the sensor data provided by the vehicle device 114. Based on the provided sensor data, the high-fidelity event models 1004 can determine the second probability of the event. The second probability of the event may identify a second probability that an event has occurred based on the sensor data (e.g., a probability that the user of the vehicle is distracted based on the probability of an occurrence of a particular feature associated with one or more objects of the sensor data). Therefore, the high-fidelity event models 1004 can determine a second probability of the event.

At [8], the high-fidelity event models 1004 can provide the second probability to the event analysis system 120. In some embodiments, the high-fidelity event models 1004 may provide a second probability for each set of sensor data received from the event analysis system 120. Further, the high-fidelity event models 1004 may periodically or aperiodically provide a second probability to the event analysis system 120. In some embodiments, the high-fidelity event models 1004 can provide the probability of the occurrence of the particular feature to the event analysis system 120. Therefore, the high-fidelity event models 1004 can provide the first probability to the event analysis system 120.

At [9], the event analysis system 120 can compare the first probability and the second probability to determine an error and/or possible optimizations that may be made to one or more edge event models 1002 executed at the vehicle device 114. For example, the event analysis system 120 can compare the first probability and the second probability to determine if the edge event models 1002 are identifying false positives, true positives, false negatives, and/or true negatives. In some embodiments, the event analysis system can compare the probabilities of the occurrence of the particular feature generated by the high-fidelity event models 1004 and the edge event models 1002. The event analysis system 120 may compare the first probability and the second probability by comparing the first probability and the second probability with the threshold number. For example, the event analysis system 120 may compare the first probability and the second probability by determining if the first probability and the second probability are both greater than a particular threshold number (e.g., both identify the occurrence of an event), if the first probability and the second probability are both less than the particular threshold number (e.g., both identify the non-occurrence of an event), or if the first probability and the second probability are within a particular threshold range of each other. In some embodiments, the event analysis system 120 may provide the second probability to the vehicle device 114 and the vehicle device 114 may compare the first probability and the second probability. Therefore, the event analysis system 120 and/or the vehicle device 114 may compare the first probability and the second probability.

Figure 10B:
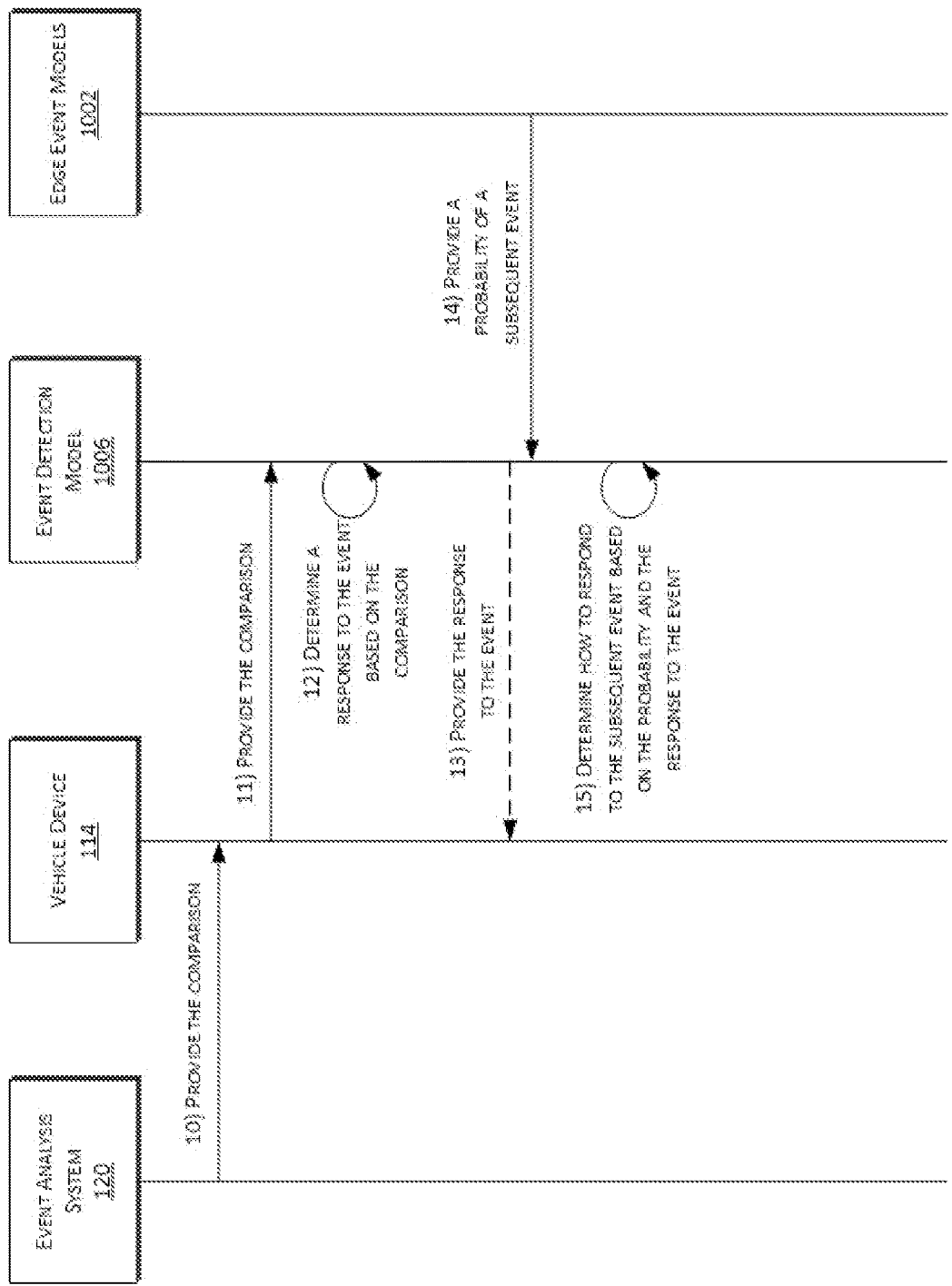
FIG. 10B illustrates an example flow diagram for determining how to respond to subsequent events based on comparing probabilities of an event, according to various embodiments of the present disclosure.

FIG. 10B depicts interactions among various components shown in FIG. 2 and FIG. 9 for adjusting how a vehicle device detects events in accordance with aspects of the present disclosure. The interactions of FIG. 10B may occur subsequent to the interactions [1]-[9] of FIG. 10A and may be based at least in part on the interactions [1]-[9] of FIG. 10A. The environment 1000B may include various components implemented in a configuration as identified in FIG. 2 and FIG. 9. The environment 1000B may include an event analysis system 120, a vehicle device 114, an event detection model 1006 associated with the vehicle device 114, and edge event models 1002 associated with the vehicle device 114. In some embodiments, the vehicle device 114 may implement (e.g., execute) the edge event models 1002 and/or the event detection model 1006. In other embodiments, a separate system may implement the edge event models 1002 and/or the event detection model. It will be understood that the environment 1000B may include more, less, or different components.

As shown in FIG. 10B at [10], the event analysis system 120 may provide the comparison of the first probability (e.g., the probability generated by the edge event models 1002) with the second probability (e.g., the probability generated by the high-fidelity event models 1004) to the vehicle device 114. The event analysis system 120 may provide the comparison by providing the results of the comparison to the vehicle device 114. For example, the event analysis system 120 may indicate whether the first probability and the second probability match (e.g., with respect to a threshold number) or do not match. In some embodiments, the event analysis system 120 may provide the second probability to the vehicle device 114 and the vehicle device 114 may generate the comparison. Therefore, the event analysis system 120 can provide the comparison to the vehicle device 114.

At [11], the vehicle device 114 may provide the comparison of the first probability with the second probability to the event detection model 1006. The event detection model 1006 may be a model for determining how to respond to particular probabilities. For example, the event detection model 1006 may be trained to identify an event based on a particular probability. Further, the event detection model 1006 may be trained to identify an event based on a threshold number and/or based on a wait period. Further, the event detection model 1006 may be trained to identify potential (e.g., likely false positive events) based on a particular probability. Therefore, the vehicle device 114 can provide the comparison to the event detection model 1006.

At [12], event detection model 1006 can determine a response to the event based on the comparison. Based on the event corresponding to a false positive event, the event detection model 1006 can perform one or more operations to adjust how events are identified by the event detection model 1006. For example, the event detection model 1006 can adjust the wait period between attempting to identify events based on the event corresponding to a false positive event. If the event corresponds to a false positive event, the event detection model 1006 can increase a wait period between a subsequent attempt to identify an event (e.g., from 10 seconds to 30 seconds). If the event corresponds to a true positive event, the event detection model 1006 can decrease the wait period between a subsequent attempt to identify an event. Any adjustments to the wait period may be iterative. Further, the event detection model 1006 can adjust the threshold number. The event detection model 1006 may identify that the probability identifies an event based on the event exceeding and/or matching a threshold number. If the event corresponds to a false positive event, the event detection model 1006 can increase the threshold number (e.g., from 80% to 82%) such that the event detection model 1006 identifies less events. In some embodiments, the increase in the threshold number may be based on the first probability. For example, if the first probability is 75% and is found to be a false positive event, the event detection model 1006 may increase the threshold number to 76%. If the event corresponds to a true positive event or a false negative event, the event detection model 1006 can decrease the threshold number such that the event detection model 1006 identifies more events. Further, the vehicle device 114 can train the event detection model 1006 to identify the false positive events. For example, the vehicle device 114 can provide characteristics associated with the sensor data and/or the probabilities as an input to the event detection model 1006 and provide the second probability as an expected output of the event detection model 1006. Therefore, the event detection model 1006 can determine the response to the event based on the comparison.

In some embodiments, at [13], the event detection model 1006 can provide the response to the event to the vehicle device 114. The event detection model 1006 may, based on the response to the event, adjust one or more parameters of the vehicle device 114. For example, the event detection model 1006 may adjust the events that are displayed by the vehicle device 114. Therefore, the event detection model 1006 can provide the response to the vehicle device 114.

At [14], the edge event models 1002 can provide a probability of a subsequent event to the event detection model 1006. The vehicle device 114 may implement the edge event models 1002 by providing additional sensor data as input. Based on the provided additional sensor data, the edge event models 1002 can determine the probability of a subsequent event. The probability of the subsequent event may identify the probability that an event has occurred based on the additional sensor data. Therefore, the edge event models 1002 can determine and provide a probability of a subsequent event.

At [15], the event detection model 1006 can determine how to respond to the subsequent event based on the probability of the sequent event and the response to the event. Further, the event detection model 1006 may determine how to respond to the subsequent event based on the one or more operations performed by the event detection model 1006. For example, based on the one or more operations, while the event detection model 1006 may have previously identified the occurrence of the subsequent event based on the probability, the event detection model 1006 may no longer identify the occurrence of the subsequent event. Further, the modification of the threshold number and/or the wait period may cause the event detection model 1006 to not identify the occurrence of the subsequent event. Additionally, the event detection model 1006 may determine that the subsequent event represents a false positive event based on a previous training using the first and second probabilities and may not identify the occurrence of the subsequent event. Therefore, the event detection model 1006 can determine how to respond to the subsequent event based on the determined response to the event.

Example Method of Utilizing a Model Feedback Loop to Adjust Event Detection

Figure 11:
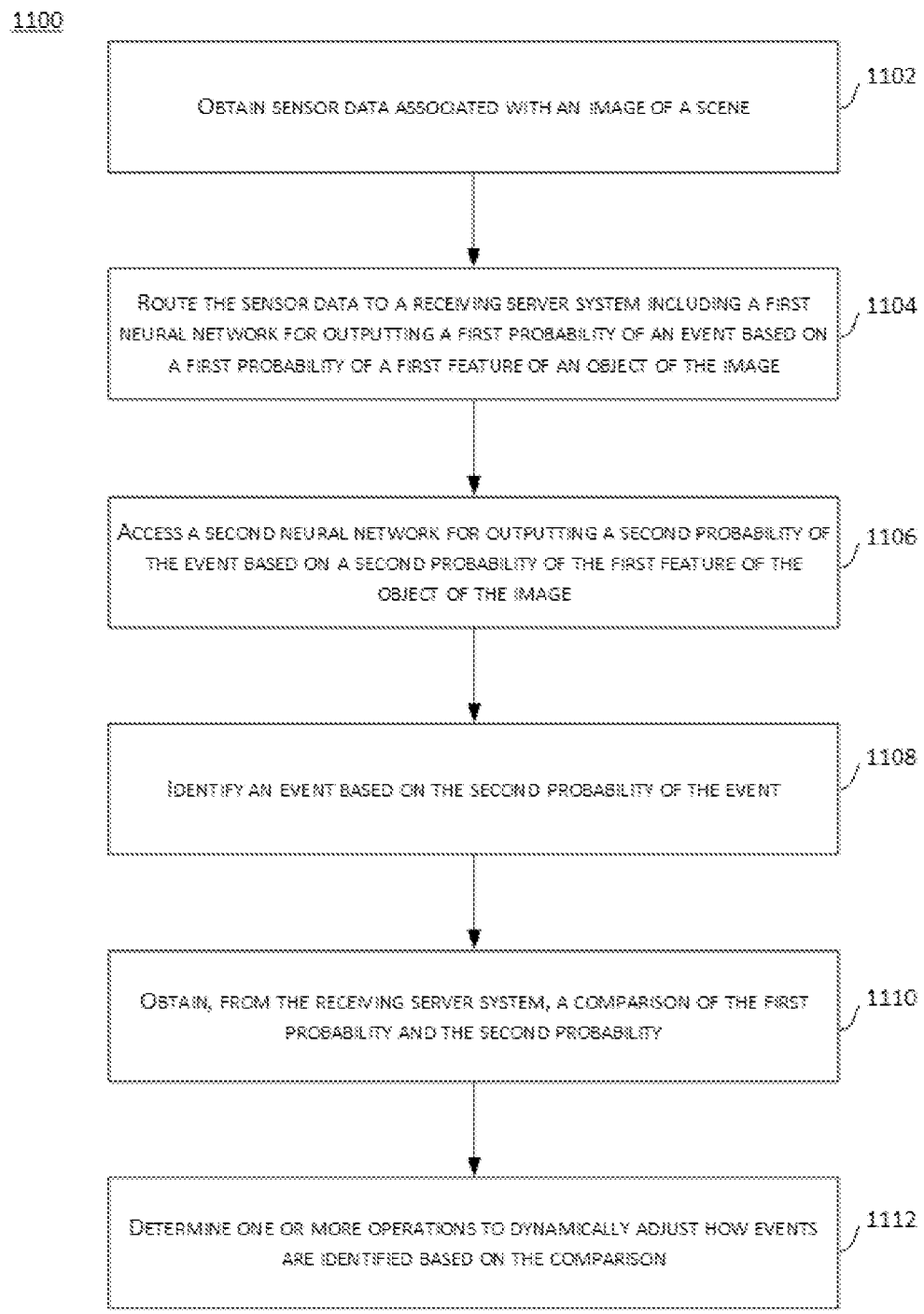
FIG. 11 illustrates an example method of dynamically adjusting how events are identified based on machine learning model feedback, according to various embodiments of the present disclosure.

FIG. 11 illustrates an example method 1100 of utilizing a machine learning model feedback loop to adjust how events are identified and detected by a vehicle device, according to various embodiments described herein.

At block 1102, the vehicle device (e.g., a gateway device, a vehicle gateway device, a gateway system, etc.) obtains sensor data associated with an image of a scene. The sensor data may identify one or more objects of the image. In some embodiments, the sensor data may include streaming sensor data. In other embodiments, the sensor data may include batch sensor data. Further, the sensor data may be associated with a noisy environment and/or an obstructed environment. Therefore, the vehicle device obtains the sensor data.

At block 1104, the vehicle device routes the sensor data to a receiving server system including a first neural network for outputting a first probability of an event based on a first probability of a first feature of an object of the image. The vehicle device may route the sensor data using a network connection (e.g., a persistent network connection) with the receiving server system. The event may be a distracted state of a user of the vehicle. Therefore, the vehicle device routes the sensor data to the receiving server system.

At block 1106, the vehicle device accesses a second neural network for outputting a second probability of the event based on a second probability of a first feature of the object of the image. The second neural network may be trained using a plurality of sensor data associated with known features of known objects. Therefore, the vehicle device accesses the second neural network.

At block 1108, the vehicle device identifies an event based on the second probability of the event. The vehicle device may identify the event by generating the event using a third neural network based on the second probability of the event. Further, the vehicle device may identify the event based on a wait period (e.g., a prediction schedule). For example, the vehicle device may periodically identify events based on the wait period. The vehicle device may include an event detection model for identifying the events and the event detection model may identify the event based on a wait period and/or a threshold number. The vehicle device may determine the second probability of the event is greater than a threshold number (e.g., a prediction threshold) and may identify the event based on the wait period and based on determining the second probability of the event is greater than the threshold number. In some embodiments, the vehicle device may identify the event at a frame by frame level. Further, the second probability of the event may be associated with a first frame, and to identify the event, the vehicle device may identify the event based on the second probability of the event and a third probability of the event associated with a second frame (e.g., a subsequent or prior frame). Therefore, the vehicle device identifies an event based on the second probability of the event.

At block 1110, the vehicle device obtains, from the receiving server system, a comparison of the first probability (e.g., the first probability of the event and/or the first probability of the first feature) and the second probability (e.g., the second probability of the event and/or the second probability of the first feature). Based on the comparison of the first probability and the second probability, the vehicle device may further determine the event is a false positive event (e.g., where the second probability exceeds the threshold number and the first probability does not exceed the threshold number). In some embodiments, based on the comparison of the first probability and the second probability, the vehicle device may determine the event is a false negative event (e.g., where the second probability does not exceed the threshold number and the first probability exceeds the threshold number). Further, the vehicle device may obtain input from a user computing device defining false positive events. In order to obtain the input, the vehicle device may provide an indication of the event to the user computing device. Based on the input, the vehicle device may determine the event is a false positive event. In some embodiments, based on the comparison of the first probability and the second probability, the vehicle device may determine the feature is a false positive feature or false negative feature. Therefore, the vehicle device obtains the comparison of the first probability and the second probability.

At block 1112, the vehicle device determines one or more operations to dynamically adjust how events are identified based on the comparison. The vehicle device may further determine one or more operations to dynamically adjust how the vehicle device identifies events. The vehicle device may determine and implement the one or more operations based on the determination that the event is a false positive event. In some embodiments, the vehicle device may determine and implement the one or more operations based on the determination and/or identification of multiple false positive events. The one or more operations may include adjusting the wait period (e.g., the prediction schedule) based on determining the event comprises a false positive event to increase the time between attempting to identify another event. Further, the one or more operations may include adjusting the threshold number (e.g., the prediction threshold) based on determining the event comprises a false positive event to increase the threshold number required to identify an event. Further, the one or more operations may include training the third neural network. Training the third neural network may include providing the first probability as an expected output of the third neural network and the second probability and/or one or more characteristics (e.g., characteristics of the image) as input of the third neural network. For example, the one or more characteristics may include time of day data, a time associated with the generation of the event, a confidence score of the event, or any other characteristics. In some embodiments, the vehicle device may determine and implement one or more operations based on the determination and/or identification of one or more false negative events. For example, the vehicle device may adjust the threshold number based on determining the event comprises a false negative event to decrease the threshold number required to identify an event. Therefore, the vehicle device determines the one or more operations.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression, or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality may be accessible by a user through a web-based viewer (such as a web browser), or other suitable software program. In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the webbrowser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments may not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A vehicle device implemented in a vehicle, the vehicle device comprising:
   a computer readable storage medium having program instructions embodied therewith; and
   one or more processors configured to execute the program instructions to cause the vehicle device to:
      obtain sensor data associated with an image of a driver of the vehicle from one or more sensors of the vehicle, the sensor data identifying the driver;
      route the sensor data from the vehicle device to a receiving server system using a network connection between the vehicle device and the receiving server system, wherein the receiving server system comprises a first neural network, wherein the first neural network outputs a first probability of an event associated with the driver;
      access a second neural network, wherein the second neural network outputs a second probability of the event;
      obtain a comparison of the first probability of the event output by the first neural network and the second probability of the event output by the second neural network;
      determine one or more updates to the vehicle device based on the comparison of the first probability of the event output by the first neural network and the second probability of the event output by the second neural network;
      automatically update the second neural network with the determined one or more updates based on the comparison of the first probability of the event output by the first neural network and the second probability of the event output by the second neural network, wherein the one or more updates cause an increase to an accuracy of the vehicle device in identifying the event; and
      in response to detecting the event based on the updated second neural network, provide sensor data associated with the detected event as part of a coaching user interface.

2. A vehicle device comprising:
   a computer readable storage medium having program instructions embodied therewith; and
   one or more processors configured to execute the program instructions to cause the vehicle device to:
      obtain sensor data associated with an image of a scene;
      route the sensor data to a receiving server system using a network connection with the receiving server system, wherein the receiving server system comprises a first neural network, wherein the first neural network is configured to output a first probability of an event associated with the image;
      access a second neural network, wherein the second neural network is configured to output a second probability of the event;
      obtain a comparison of the first probability of the event output by the first neural network and the second probability of the event output by the second neural network;
      determine one or more operations to dynamically adjust how the vehicle device identifies the event based on the comparison of the first probability of the event output by the first neural network and the second probability of the event output by the second neural network; and
      automatically perform the determined one or more operations based on the comparison of the first probability of the event output by the first neural network and the second probability of the event output by the second neural network, wherein performance of the determined one or more operations increases an accuracy of the vehicle device in identifying the event.

3. The vehicle device of claim 2, wherein the image of the scene corresponds to an image of a driver associated with a vehicle, the vehicle device implemented in the vehicle, the sensor data including one or more objects in the image, wherein the event is associated with a feature of the one or more objects, and wherein the one or more objects comprise at least one of a face of the driver or one or more hands of the driver, and wherein the feature of the one or more objects comprises at least one of a hand action of the driver or a face pose of the driver.

4. The vehicle device of claim 2, wherein the event comprises a distracted state of a driver.

5. The vehicle device of claim 2, wherein the one or more processors are configured to execute the program instructions to further cause the vehicle device to:
   determine the event comprises a false positive event in response to determining that the first probability of the event output by the first neural network exceeds the second probability of the event output by the second neural network by at least a particular amount.

6. The vehicle device of claim 2, wherein the one or more processors are configured to execute the program instructions to further cause the vehicle device to identify the event based on a prediction schedule, wherein the one or more processors are configured to execute the program instructions to further cause the vehicle device to:
   in response to determining that the event comprises a false positive event, adjust the prediction schedule.

7. The vehicle device of claim 2, wherein the one or more processors are configured to execute the program instructions to further cause the vehicle device to identify the event based on a determination that the second probability of the event output by the second neural network is greater than a prediction threshold.

8. The vehicle device of claim 7, wherein the one or more processors are configured to execute the program instructions to further cause the vehicle device to:
   determine the event comprises a false positive event based at least on the comparison of the first probability of the event output by the first neural network and the second probability of the event output by the second neural network.

9. The vehicle device of claim 8, wherein the one or more processors are configured to execute the program instructions to further cause the vehicle device to:
   adjust the prediction threshold in response to determining the event comprises the false positive event.

10. The vehicle device of claim 2, wherein the sensor data includes one or more objects in the image, wherein the event is associated with a feature of the one or more objects, wherein the one or more processors are configured to execute the program instructions to further cause the vehicle device to identify the event based at least in part on the second probability of the event output by the second neural network, wherein, to identify the event, the one or more processors are configured to execute the program instructions to further cause the vehicle device to:
   determine that the second probability of the event output by the second neural network is less than a prediction threshold indicative of non-occurrence of the feature;
   determine that the event comprises a false negative event based on the comparison of the first probability of the event output by the first neural network and the second probability of the event output by the second neural network; and
   adjust the prediction threshold based on identifying the false negative event.

11. The vehicle device of claim 2, wherein the one or more processors are configured to execute the program instructions to further cause the vehicle device to:
   identify, using a third neural network, the event based on the second probability of the event output by the second neural network.

12. The vehicle device of claim 2, wherein the one or more processors are configured to execute the program instructions to further cause the vehicle device to identify, using a third neural network, the event based on the second probability of the event output by the second neural network, wherein the one or more processors are configured to execute the program instructions to further cause the vehicle device to:
   determine the event comprises a false positive event based on the comparison of the first probability of the event output by the first neural network and the second probability of the event output by the second neural network; and
   train the third neural network, wherein the first probability of the event output by the first neural network is provided as an expected output of the third neural network, wherein one or more characteristics of the image are provided as an input to train the third neural network.

13. The vehicle device of claim 2, wherein the one or more processors are configured to execute the program instructions to further cause the vehicle device to identify, using a third neural network, the event based on the second probability of the event output by the second neural network, wherein the one or more processors are configured to execute the program instructions to further cause the vehicle device to:
   determine the event comprises a false positive event based on the comparison of the first probability of the event output by the first neural network and the second probability of the event output by the second neural network; and
   train the third neural network, wherein the first probability of the event output by the first neural network is provided as an expected output of the third neural network, wherein one or more characteristics of the image are provided as an input to train the third neural network, wherein the one or more characteristics of the image comprise time of day data, a time associated with generation of the event, or a confidence score of the event.

14. The vehicle device of claim 2, wherein the one or more processors are configured to execute the program instructions to further cause the vehicle device to generate, using a third neural network, the event based on the second probability of the event output by the second neural network, wherein the one or more processors are configured to execute the program instructions to further cause the vehicle device to:
   determine the event comprises a false positive event based on the comparison of the first probability of the event output by the first neural network and the second probability of the event output by the second neural network; and
   train the third neural network, wherein the first probability of the event output by the first neural network is provided as an expected output of the third neural network, wherein the second probability of the event output by the second neural network is provided as an input to train the third neural network.

15. The vehicle device of claim 2, wherein the second probability of the event output by the second neural network is associated with a first frame, wherein the one or more processors are configured to execute the program instructions to further cause the vehicle device to identify the event based on the second probability of the event output by the second neural network and a third probability of the event, wherein the third probability of the event is associated with a second frame.

16. The vehicle device of claim 2, wherein the one or more processors are configured to execute the program instructions to further cause the vehicle device to:
   obtain input from a user computing device; and
   determine the event comprises a false positive event based on the input.

17. The vehicle device of claim 2, wherein the one or more processors are configured to execute the program instructions to further cause the vehicle device to:
   provide an indication of the event to a user computing device;
   obtain input from the user computing device; and
   determine the event comprises a false positive event based on the input.

18. The vehicle device of claim 2, wherein the one or more processors are configured to execute the program instructions to further cause the vehicle device to:
   implement the one or more operations without retraining the second neural network;
   obtain additional sensor data associated with an additional image of an additional scene;

access the second neural network, wherein the second neural network is further configured to output a third probability of an additional event associated with the additional image; and identify the additional event based on the third probability of the additional event and the one or more operations.

19. The vehicle device of claim 2, wherein the one or more processors are configured to execute the program instructions to further cause the vehicle device to:

implement the one or more operations without retraining the second neural network; and identify a non-event based on the second probability of the event output by the second neural network and the one or more operations.

20. A computer-implemented method comprising:

obtaining sensor data associated with an image of a scene;

routing the sensor data to a receiving server system using a network connection with the receiving server system, wherein the receiving server system comprises a first neural network, wherein the first neural network is configured to output a first probability of an event associated with the image;

accessing, from a second neural network, a second probability of the event;

obtaining a comparison of the first probability of the event output by the first neural network and the second probability of the event output by the second neural network;

dynamically adjusting how events are identified by the second neural network based on the comparison of the first probability of the event output by the first neural network and the second probability of the event output by the second neural network; and automatically identifying one or more events based on the second neural network, wherein the automatically identifying the one or more events causes an increase in accuracy of a vehicle device identifying the event.

* * * * *